US011498349B2

(12) United States Patent
Valenti, Jr. et al.

(10) Patent No.: US 11,498,349 B2
(45) Date of Patent: Nov. 15, 2022

(54) MULTI-LAYER LABEL ASSEMBLY APPARATUS

(71) Applicant: Chicago Tag & Label, Inc., Libertyville, IL (US)

(72) Inventors: F. Paul Valenti, Jr., Barrington, IL (US); Carl Opel, Carol Stream, IL (US); Daniel Hedger, Grayslake, IL (US); Don Starr, Ft. Myers, FL (US)

(73) Assignee: Chicago Tag & Label, Inc., Libertyville, IL (US)

( * ) Notice: Subject to any disclaimer, the term of this patent is extended or adjusted under 35 U.S.C. 154(b) by 0 days.

(21) Appl. No.: 16/243,656

(22) Filed: Jan. 9, 2019

(65) Prior Publication Data

US 2019/0143724 A1 May 16, 2019

Related U.S. Application Data

(63) Continuation-in-part of application No. 15/785,995, filed on Oct. 17, 2017, now Pat. No. 10,604,294, which is a continuation-in-part of application No. 15/293,397, filed on Oct. 14, 2016, now Pat. No. 10,198,971.

(Continued)

(51) Int. Cl.

| | |
|---|---|
| ***B41J 29/38*** | (2006.01) |
| ***B41J 3/407*** | (2006.01) |
| ***B65C 9/46*** | (2006.01) |
| ***B41J 13/10*** | (2006.01) |
| ***B41F 19/00*** | (2006.01) |
| ***B32B 38/00*** | (2006.01) |
| ***B29C 65/00*** | (2006.01) |
| ***B65C 11/02*** | (2006.01) |

(52) U.S. Cl.

CPC ............... *B41J 29/38* (2013.01); *B41F 19/00* (2013.01); *B41J 3/4075* (2013.01); *B41J 13/106* (2013.01); *B65C 9/46* (2013.01); *B29C 66/90* (2013.01); *B32B 38/145* (2013.01); *B65C 11/02* (2013.01); *B65C 2210/0037* (2013.01)

(58) Field of Classification Search

CPC ....... B32B 7/06; B32B 2519/00; B32B 33/00; B32B 37/025; B32B 38/145; B65C 1/021; B65C 9/46; B65C 9/0015; B65C 9/1884; B65C 9/36; B65C 2009/005; B65C 2009/402; B65C 11/02; B65C 2210/0037; G09F 3/10; G09F 2003/0226; G09F 2003/0247; G09F 2003/02; B41J 13/106; B41J 29/38; B41J 3/4075; B29C 66/90; B41F 19/00

USPC ................ 156/247, 249, 289, 350, 384, 387

See application file for complete search history.

(56) References Cited

U.S. PATENT DOCUMENTS 2,725,244 A * 11/1955 Friday ................ B65D 83/0882 225/41

3,577,296 A * 5/1971 Phillips et al. ......... B65C 11/02 156/249

(Continued)

FOREIGN PATENT DOCUMENTS

EP 0052848 A1 * 6/1982 ............... B65C 9/46

*Primary Examiner* — Sonya M Sengupta

(74) *Attorney, Agent, or Firm* — Ice Miller LLP

(57) ABSTRACT

A multi-layer label assembly apparatus. A label printing apparatus, a label dispensing mechanism, and a receptacle affixed to the label printing apparatus in a position adjacent the label dispensing mechanism are provided.

20 Claims, 20 Drawing Sheets

500 506 100' 100A' 5021 506 502 5027 5027

Related U.S. Application Data

(60) Provisional application No. 62/651,872, filed on Apr. 3, 2018, provisional application No. 62/242,584, filed on Oct. 16, 2015.

(56) References Cited

U.S. PATENT DOCUMENTS 3,779,829 A * 12/1973 Wolff ...................... B65C 9/188 156/364
3,985,605 A * 10/1976 Treiber ..................... B65C 9/46 156/384
3,989,929 A * 11/1976 Treiber ..................... B65C 9/46 235/432
4,295,915 A * 10/1981 Sakaguchi ................ B65C 9/46 156/542
4,460,428 A * 7/1984 Teraoka .................. B65C 1/021 705/414
5,157,903 A * 10/1992 Nakashima ............. B65B 11/54 493/476
6,231,253 B1 * 5/2001 Henderson ........... B65H 75/242 101/288
8,142,596 B1 * 3/2012 Valenti, Jr. .............. B65C 1/021 156/289
9,812,040 B1 * 11/2017 Valenti, Jr. ................ B65C 9/46
10,198,971 B1 * 2/2019 Valenti, Jr. ................ G09F 3/02
2014/0081451 A1 * 3/2014 Repp ...................... G06Q 20/18 700/233
2017/0008317 A1 * 1/2017 Cummins .............. B41J 3/4075
2019/0047738 A1 * 2/2019 Nishimura ............ B65C 9/0065

* cited by examiner

MULTI-LAYER LABEL ASSEMBLY APPARATUS

CROSS-REFERENCE TO RELATED APPLICATIONS

The present application:

(a) claims priority to U.S. Provisional Patent Application No. 62/651,872, filed Apr. 3, 2018; and (b) is a continuation in part of U.S. application Ser. No. 15/785,995, filed Oct. 17, 2017; which is a continuation in part of U.S. application Ser. No. 15/293,397, filed Oct. 14, 2016; which is a non-provisional of, and claims priority to U.S. Provisional Patent Application No. 62/242,584, filed Oct. 16, 2015. The disclosure of each of the foregoing applications is incorporated by reference in its entirety.

BACKGROUND

Labels are commonly used to secure printed indicia to packages to indicate shipping or other information. In the instance of a shipping use, a separate packing list may be enclosed within a package shipped to the customer containing a purchased item.

There is significant demand for a labeling method that allows printing and application of a lower label and an upper label to a surface. For example, there is significant demand for a labeling method that allows printing and application of a packing list and shipping label to the surface of a sealed carton. Because the carton is sealed prior to packing list generation, it is not efficient to open it to insert a packing list. High volume shipping of such packages requires rapid attachment of a packing list and a shipping label to the package. It is preferred to conceal the information of the packing list until the final recipient receives the shipped package.

For the foregoing reasons, it is desired to provide labeling forms and methods that allows printing and application of a packing list label and shipping label to the surface of a sealed carton while avoiding the many shortcomings of existing labeling forms and methods.

SUMMARY

The present disclosure includes disclosure of at least one system of labels for application to a surface. In at least one embodiment, a label system according to the present disclosure comprises a carrier material, an upper label, and a lower label. An upper label of at least one such embodiment comprises a top surface and an opposing undersurface, the top surface and the undersurface having a leading edge and a trailing edge, and the undersurface in contact with the carrier material. A lower label of at least one such embodiment comprises a top side and an opposing underside, the top side and the underside having a leading margin and a trailing margin, and the underside being in contact with the carrier material. According to at least one such embodiment of the present disclosure, the upper label and the lower label are in contact with the carrier material in adjacent positions with the trailing edge adjacent to the leading margin, and the upper label and the lower label are configured for dispensing sequentially from the carrier material onto a label applicator apparatus such that when the upper label and the lower label are dispensed onto the label applicator apparatus the lower label is positioned against the undersurface of the upper label prior to attachment of the upper label and the lower label to an article.

In an aspect of at least one embodiment of the present disclosure, an upper label comprises a removable segment and a lower label comprises a removable region, and when the upper label and the lower label are dispensed onto a label applicator apparatus, the removable segment and the removable region are in registration.

In an aspect of at least one embodiment of the present disclosure, an undersurface comprises a zone with reduced adhesive properties and an underside comprises an area with reduced adhesive properties, and when an upper label and a lower label are dispensed onto a label applicator apparatus the zone with reduced adhesive properties and the area with reduced adhesive properties are in registration.

In aspect of at least one embodiment of the present disclosure, the zone with reduced adhesive properties comprises an adhesive layer covered with an adhesive deadening agent.

In an aspect of at least one embodiment of the present disclosure, the area with reduced adhesive properties comprises an adhesive layer covered with an adhesive deadening agent.

In an aspect of at least one embodiment of the present disclosure, an upper label comprises one or more holes therethrough, and when the upper label and a lower label are dispensed onto a label applicator apparatus, the lower label is held in position against the undersurface of the upper label by a vacuum force generated by the label applicator apparatus, the vacuum force acting through the one or more holes.

In an aspect of at least one embodiment of the present disclosure, all of the underside comprises reduced adhesive properties.

In an aspect of at least one embodiment of the present disclosure, all of the underside comprises an adhesive layer covered with an adhesive deadening agent.

In an aspect of at least one embodiment of the present disclosure, the undersurface comprises pressure sensitive adhesive that removably adheres the undersurface to the carrier material.

In at least one embodiment, a label system according to the present disclosure comprises a carrier material, an upper label, and a lower label. An upper label of at least one such embodiment is removably adhered to the carrier material, and comprises a top surface, an undersurface, and a removable segment. An upper label of at least one such embodiment is bounded by a leading edge, a trailing edge, and first and second side edges. The undersurface of an upper label of at least one such embodiment comprises adhesive on at least a portion thereof and such an upper label is removably adhered to the carrier material by the adhesive. A lower label of at least one such embodiment is removably adhered to the carrier material in a position on the carrier material adjacent to the upper label and comprises a top side and an opposing underside. A lower label of at least one such embodiment is bounded by a leading margin, a trailing margin, and a first and second side margins. According to at least one such embodiment of the present disclosure, the upper label and the lower label are configured for dispensing sequentially from the carder material onto a label applicator apparatus, such that when the upper label and the lower label are dispensed onto the label applicator apparatus the top surface is positioned against the label applicator apparatus, the top side of lower label is positioned against the undersurface of the upper label, and the underside is exposed.

In an aspect of at least one embodiment of the present disclosure, the top side of an upper label comprises a first surface area circumscribed by the leading margin, the trailing margin, and the first and second side margins, and the top surface of a lower label comprises a second surface area circumscribed by the leading edge, the trailing edge, and the first and second side edges, and the second surface area is not larger than the first surface area.

In at least one embodiment, a label system according to the present disclosure comprises a carrier material, a removable upper label on the carrier material, and a removable lower sheet on the carrier material in a position on the carrier material adjacent to the upper label. An upper label of at least one such embodiment comprises a top surface and an opposing undersurface, the undersurface facing the carrier material. A lower sheet of at least one such embodiment comprises a top side and an opposing underside, the underside facing the carrier material. According to at least one such embodiment of the present disclosure, wherein the upper label and the lower sheet are configured for dispensing sequentially from the carrier material onto a label applicator apparatus such that the top side of the lower sheet is positioned against the undersurface when the upper label and the lower sheet are dispensed onto the label applicator apparatus.

In an aspect of at least one embodiment of the present disclosure, an upper label comprises a removable segment, and a lower sheet comprises a removable region, and when the lower sheet is dispensed onto the label applicator apparatus, the removable segment and the removable region are in registration.

In an aspect of at least one embodiment of the present disclosure, the undersurface of an upper label comprises a zone with reduced adhesive properties, and the underside of a lower sheet comprises an area with reduced adhesive properties, and when the lower sheet is dispensed onto the label applicator apparatus, the zone with reduced adhesive properties and the area with reduced adhesive properties are in registration.

In an aspect of at least one embodiment of the present disclosure, the zone with reduced adhesive properties comprises an adhesive layer covered with an adhesive deadening agent.

In an aspect of at least one embodiment of the present disclosure, the area with reduced adhesive properties comprises an adhesive layer covered with an adhesive deadening agent.

In an aspect of at least one embodiment of the present disclosure, an upper label comprises one or more holes therethrough, and a lower sheet is held in position against the undersurface of the upper label by the vacuum force generated by a label applicator apparatus, the vacuum force acting through the one or more holes.

In an aspect of at least one embodiment of the present disclosure, a lower sheet is held in position against the undersurface of the upper label by a vacuum force generated by a label applicator apparatus.

In an aspect of at least one embodiment of the present disclosure, all of the underside of a lower sheet comprises reduced adhesive properties.

In an aspect of at least one embodiment of the present disclosure, all of the underside of a lower sheet comprises an adhesive layer covered with an adhesive deadening agent.

In an aspect of at least one embodiment of the present disclosure, the undersurface of an upper label comprises adhesive, and when a lower sheet is dispensed onto the label applicator apparatus the adhesive on the undersurface adhesively interacts with the top side of the lower sheet.

In at least one embodiment, a label system according to the present, disclosure comprises a first label, the first label comprising a sheet material having, an upper side and an opposing lower side, the upper side and the lower side bounded by a leading edge, a trailing edge, and first and second side edges connecting the leading edge and the trailing edge, at least one line of weakness in the sheet material, the at least one line of weakness not intersecting with any of the leading edge, the trailing edge, or the first or second side edges, the at least one line of weakness comprising at least one non-linear segment having an apex oriented toward the leading edge, wherein the at least one line of weakness defines a removable region within the at least one line of weakness, and a frame region outside of the at least one line of weakness, and adhesive on at least a portion of the frame region of the lower side; and a second label identical to the first label, the second label layered over and adhered to the first label with the removable regions of the first label and the second label in registration.

In at least one embodiment, a label system according to the present disclosure comprises a first label, the first label comprising a sheet material having an upper side and an opposing lower side, the upper side and the lower side bounded by a leading edge, a trailing edge, and first and second side edges connecting the leading edge and the trailing edge, at least one line of weakness in the sheet material, the at least one line of weakness not intersecting with any of the leading edge, the trailing edge, or the first or second side edges, the at least one line of weakness comprising at least one non-linear segment having an apex oriented toward the leading edge, wherein the at least one line of weakness defines a removable region within the at least one line of weakness, and a frame region outside of the at least one line of weakness, a void in the sheet material located between the non-linear segment and the leading edge, and adhesive on at least a portion of the frame region of the lower side; and a second label identical to the first label, the second label layered over and adhered to the first label with the removable regions of the first label and the second label in registration.

In at least one embodiment, a label system according to the present disclosure comprises a first label, the first label comprising a sheet material having an upper side and an opposing lower side, the upper side and the lower side bounded by a leading edge, a trailing edge, and first and second side edges connecting the leading edge and the trailing edge, at least one line of weakness in the sheet material, the at least one line of weakness comprising at least one non-linear segment having an apex oriented toward and intersecting with the leading edge, the at least one line of weakness not otherwise intersecting with any of the leading edge, the trailing edge, or the first or second side edges, wherein the at least one line of weakness defines a removable region within the at least one line of weakness, and a frame region outside of the at least one line of weakness, and adhesive on at least a portion of the frame region of the lower side; and a second label identical to the first label, the second label layered over and adhered to the first label with the removable regions of the first label and the second label in registration.

The present disclosure includes disclosure of methods for assembling a multi-layer label. In at least one embodiment, a method for assembling a multi-layer label according to the present disclosure comprises the steps of providing a label printing apparatus, said label printing apparatus comprising a printing mechanism, a dispensing mechanism, and a receptacle; providing a carrier material to said label printing apparatus, said carrier material comprising a first label removably adhered to said carrier material, said first label comprising a sheet material having an upper side and an opposing lower side, said upper side and said lower side bounded by a leading edge, a trailing edge, and first and second side edges connecting said leading edge and said trailing edge, at least one line of weakness in said sheet material, said at least one line of weakness not intersecting with any of said leading edge, said trailing edge, or said first or second side edges, said at least one line of weakness comprising at least one non-linear segment having an apex oriented toward said leading edge, wherein said at least one line of weakness defines a removable region within said at least one line of weakness, and a frame region outside of said at least one line of weakness, and adhesive on at least a portion of said frame region of said lower side; separating said first label from said carrier material with said label printing apparatus; dispensing said first label from said label printing apparatus onto said receptacle; advancing said carrier material to provide a second label adjacent to said first label and removably adhered to said carrier material, said second label identical in structure to said first label; separating said second label from said carrier material with said label printing apparatus; and dispensing said second label from said carrier material, wherein said second label alights on said first label such that said second label is layered over and adhered to said first label with said removable regions of said first label and said second label in registration.

In at least one embodiment, a method for assembling a multi-layer label according to the present disclosure comprises the steps of providing a label printing apparatus, said label printing apparatus comprising a printing mechanism, a dispensing mechanism, and a receptacle; providing a carrier material to said label printing apparatus, said carrier material comprising a first label removably adhered to said carrier material, said first label comprising a sheet material having an upper side and an opposing lower side, said upper side and said lower side bounded by a leading edge, a trailing edge, and first and second side edges connecting said leading edge and said trailing edge, at least one line of weakness in said sheet material, said at least one line of weakness not intersecting with any of said leading edge, said trailing edge, or said first or second side edges, said at least one line of weakness comprising at least one non-linear segment having an apex oriented toward said leading edge, wherein said at least one line of weakness defines a removable region within said at least one line of weakness, and a frame region outside of said at least one line of weakness, a void in said sheet material located between said non-linear segment and said leading edge, and adhesive on at least a portion of said frame region of said lower side; separating said first label from said carrier material with said label printing apparatus; dispensing said first label from said label printing apparatus onto said receptacle; advancing said carrier material to provide a second label adjacent to said first label and removably ad tiered to said carrier material, said second label identical in structure to said first label; separating said second label from said carrier material with said label printing apparatus; and dispensing said second label from said carrier material, wherein said second label alights on said first label such that said second label is layered over and adhered to said first label with said removable regions of said first label and said second label in registration.

In at least one embodiment, a method for assembling a multi-layer label according to the present disclosure comprises the steps of providing a label printing apparatus, said label printing apparatus comprising a printing mechanism, a dispensing mechanism, and a receptacle; providing a carrier material to said label printing apparatus, said carrier material comprising a first label removably adhered to said carrier material, said first label comprising a sheet material having an upper side and an opposing lower side, said upper side and said lower side bounded by a leading edge, a trailing edge, and first and second side edges connecting said leading edge and said trailing edge, at least one line of weakness in said sheet, material, said at least one line of weakness comprising at least one non-linear segment having an apex oriented toward and intersecting with said leading edge, said at least one line of weakness not otherwise intersecting with any of said leading edge, said trailing edge, or said first or second side edges, wherein said at least one line of weakness defines a removable region within said at least one line of weakness, and a frame region outside of said at least one line of weakness, and adhesive on at least a portion of said frame region of said lower side; separating said first label from said carrier material with said label printing apparatus; dispensing said first label from said label printing apparatus onto said receptacle; advancing said carrier material to provide a second label adjacent to said first label and removably adhered to said carrier material, said second label identical in structure to said first label; separating said second label from said carrier material with said label printing apparatus; and dispensing said second label from said carrier material, wherein said second label alights on said first label such that said second label is layered over and adhered to said first label with said removable regions of said first label and said second label in registration.

The present disclosure includes disclosure of at least one multi-layer label assembly apparatus. In at least one embodiment, a multi-layer label assembly apparatus according to the present disclosure comprises a label printing apparatus, the label printing apparatus comprising a printing mechanism, and a label dispensing, mechanism; and a receptacle affixed to the label printing apparatus in a position adjacent the label dispensing mechanism, the receptacle constructed of a rigid material, the receptacle comprising a proximal edge adjacent to the label printing apparatus and a distal edge opposite the proximal edge, the receptacle further comprising at least one substantially horizontal surface suitable for receiving a label dispensed from the label dispensing mechanism, the at least one substantially horizontal surface being resistant to an adhesive on the label dispensed from the label dispensing mechanism.

In an aspect of at least one embodiment of the present disclosure, a multi-layer label assembly apparatus comprises a first label on the substantially horizontal surface of the receptacle, wherein at least a portion of the first label overhangs the distal edge of the receptacle. In an aspect of at least one embodiment of the present disclosure, a multi-layer label assembly apparatus comprises a second label layered over and aligned with the first label.

In an aspect of at least one embodiment of the present disclosure, a multi-layer label assembly apparatus comprises the distal edge of the receptacle comprises a contour defining a notched area in the distal edge. In an aspect of at least one embodiment of the present disclosure, a multi-layer label assembly apparatus comprises a first label on the substantially horizontal surface of the receptacle, wherein at least a portion of the first label overhangs the notched area.

In an aspect of at least one embodiment of the present disclosure, a multi-layer label assembly apparatus comprises a label presence sensor on a label printing apparatus; and a void in a receptacle affixed to the label printing apparatus, the void being in alignment with the label presence sensor. In an aspect of at least one embodiment of the present disclosure, a first label is on a substantially horizontal surface of the receptacle, wherein at least a portion of the first label covers the void.

In at least one embodiment, a multi-layer label assembly apparatus according to the present disclosure comprises a label printing apparatus, the label printing apparatus comprising a printing mechanism, and a label dispensing mechanism; and a receptacle positioned adjacent to the label dispensing mechanism but not affixed to the label printing apparatus, the receptacle constructed of a rigid material, the receptacle comprising a proximal edge adjacent to the label printing apparatus and a distal edge opposite the proximal edge, the receptacle further comprising at least one substantially horizontal surface suitable for receiving a label dispensed from the label dispensing mechanism, the at least one substantially horizontal surface being resistant to an adhesive on the label dispensed from the label dispensing mechanism.

In an aspect of at least one embodiment of the present disclosure, a multi-layer label assembly apparatus comprises a receptacle that comprises an upper surface and an opposing bottom surface, the multi-layer label assembly apparatus further comprising one or more legs connected to the bottom surface. In an aspect of at least one embodiment of the present disclosure, at least one of the one or more legs is adjustable.

BRIEF DESCRIPTION OF THE DRAWINGS

The features and advantages of this disclosure, and the manner of attaining them, will be more apparent and better understood by reference to the following descriptions of the disclosed methods and systems, taken in conjunction with the accompanying drawings, wherein.

DESCRIPTION

Figure 1A:
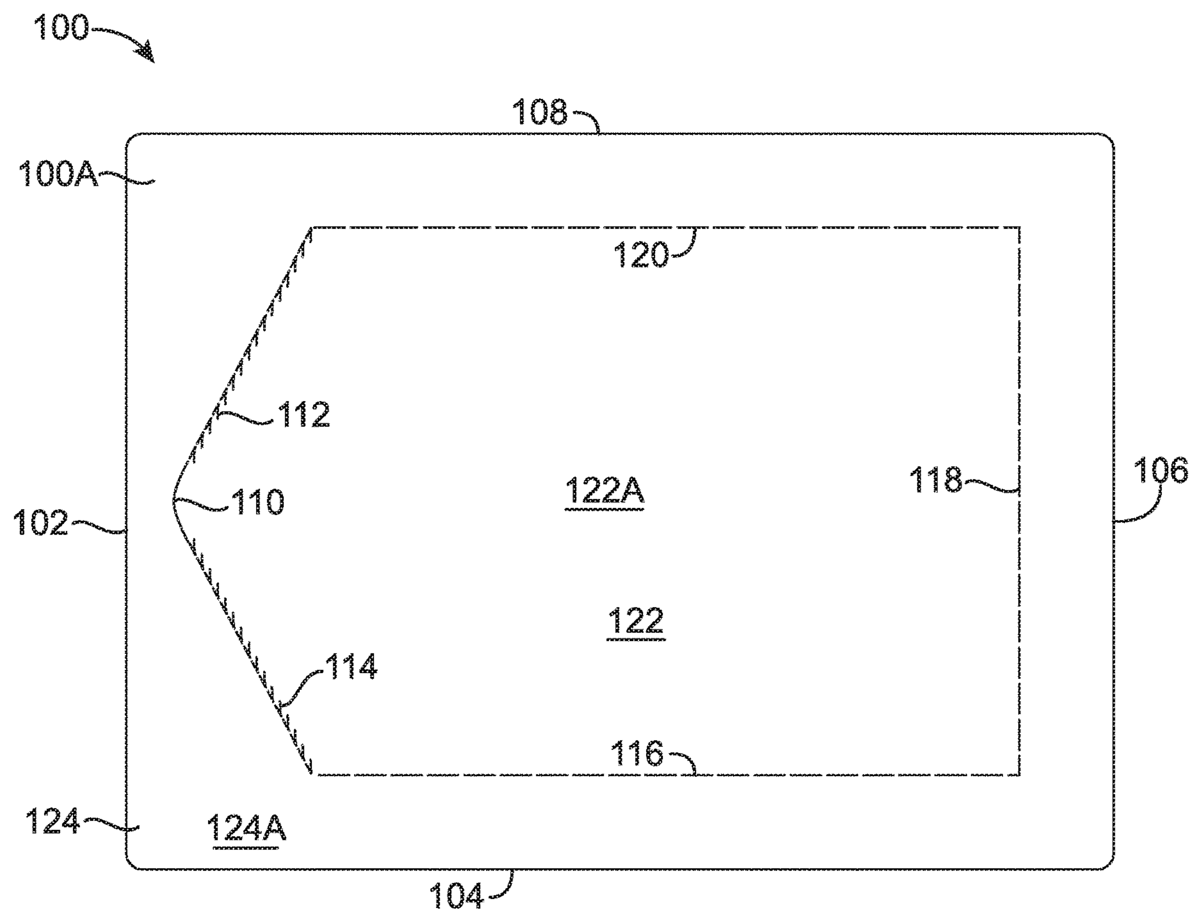
FIG. 1A shows the upper side of a label according to at least one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1A shows upper side 100A of label 100 according to at least one embodiment of the present disclosure. In at least one embodiment of the present disclosure, label 100 comprises a label stock material such as, for example, paper, polyester, or another polymer material. In at least one embodiment of the present disclosure, label 100 comprises a label stock material receptive to the printing of indicia thereon. For example, label 100 may be exposed to an ink jet printer, a laser printer, a thermal transfer printer, a direct thermal printer, or another type of printing device capable of applying indicia to label 100. The inks, toners, and/or other printing materials used in the application of indicia to label 100 are selected to be compatible with the printing device used to apply such indicia, the material used for label 100, and the intended use of label 100.

As shown in FIG. 1A, label 100 is bounded by leading edge 102, trailing edge 106, and side edges 104, 108. Label 100 also comprises removable region 122 and frame region 124. Removable region 122 comprises removable region upper surface 122A, and is bounded by lines of weakness 110, 112, 114, 116, 118, 120. Frame region 124 comprises the portion of label 100 outside of lines of weakness 110, 112, 114, 116, 118, 120, but within leading edge 102, trailing edge 106, and side edges 104, 108. As shown in FIG. 1A, frame region 124 comprises frame region upper surface 124A. In at least one embodiment of the present disclosure, indicia is added to upper side 100A of label 100. For example, indicia may be added to removable region upper surface 122A of label 100, or to frame region upper surface 124A of label 100, or to both removable region upper surface 122A and frame region upper surface 124A of label 100.

Lines of weakness 110, 112, 114, 116, 118, 120 serve to weaken the boundary between removable region 122 and frame region 124, facilitating the removal of removable region 122 from frame region 124 as discussed hereinafter.

Lines of weakness 110, 112, 114, 116, 118, 120 may comprise cuts or perforations that extend partially or completely through label 100.

In at least one embodiment of label 100, line of weakness 110 comprises a curvilinear cut that completely severs removable region 122 from frame region 124. In at least one embodiment of label 100, line of weakness 110 comprises a curvilinear cut that is the connecting an end of line of weakness 112 to an end of line of weakness 114.

In at least one embodiment of label 100, lines of weakness 112, 114 each comprises a series of angular perforations generally having a V-shape or a Y-shape. The vertex of each angular perforation of line of weakness 112 is oriented in the direction of line of weakness 120, as shown in FIG. 1A. The series of angular perforations comprising line of weakness 112 is arranged so that one side of each angular perforation is substantially coincident with a line extending between an end of line of weakness 110 and an end of line of weakness 120, and the other side of each angular perforation is oriented toward removable region 122 rather than toward frame region 124. The vertex of each angular perforation of line of weakness 114 is oriented in the direction of line of weakness 116, as shown in FIG. 1A. The series of angular perforations comprising line of weakness 114 is arranged so that one side of each angular perforation is substantially coincident with a line extending between an end of line of weakness 110 and an end of line of weakness 116, and the other side of each angular perforation is oriented toward removable region 122 rather than toward frame region 124.

In at least one embodiment of label 100, the angle between line of weakness 112 and lines of weakness 120 is greater than 90°. In at least one embodiment of label 100, the angle between line of weakness 114 and lines of weakness 116 is greater than 90°. In at least one embodiment of label 100, the angle between line of weakness 118 and line of weakness 120 is about 90°. In at least one embodiment of label 100, the angle between line of weakness 118 and line of weakness 116 is about 90°. The use of angular perforations in lines of weakness 112, 114, and the obtuse angles between line of weakness 112 and lines of weakness 120 and between line of weakness 114 and lines of weakness 116, facilitates removal of removable region 122 from frame 124 in one motion without tearing the material of removable region 122.

Figure 1B:
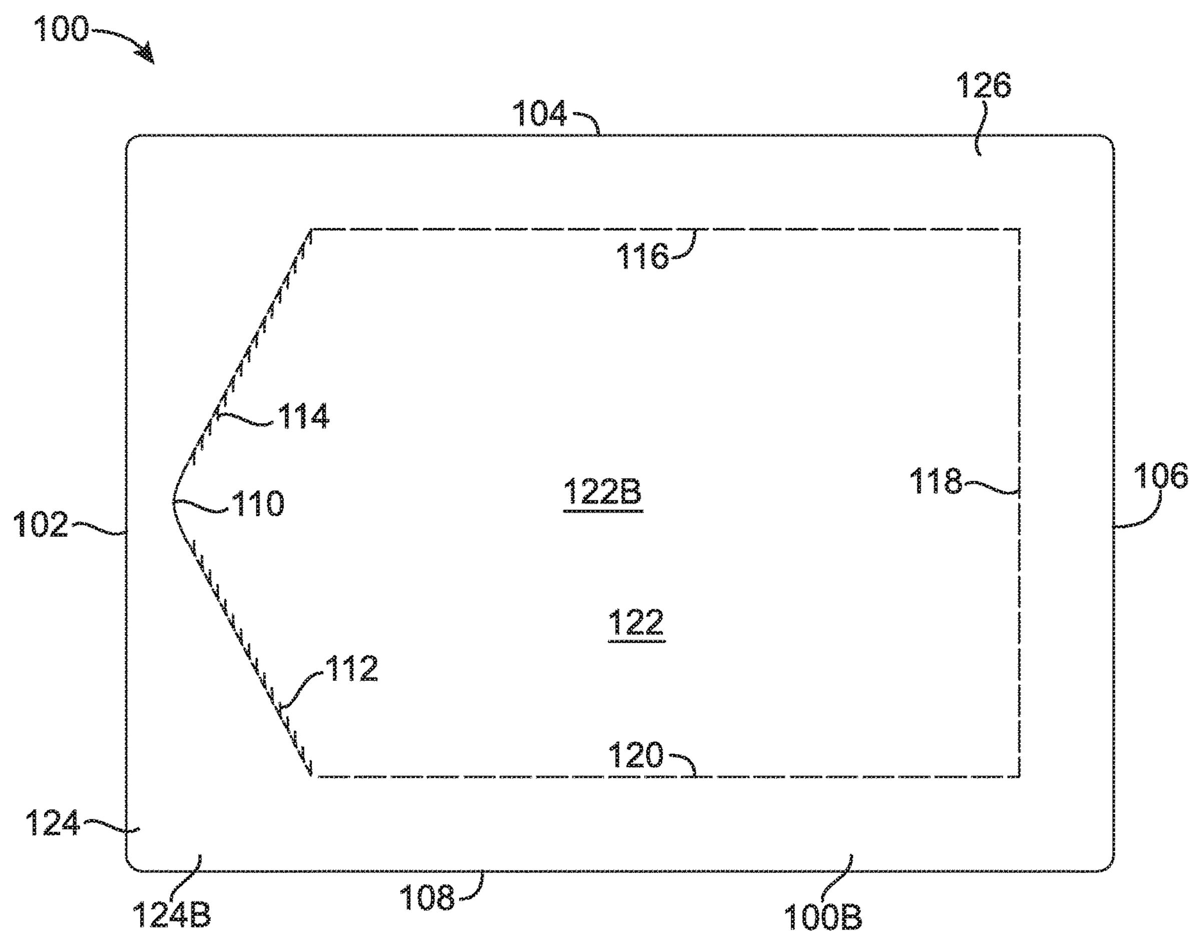
FIG. 1B shows the lower side of a label according to at least one embodiment of the present disclosure.

FIG. 1B shows lower side 100B of label 100 according to at least one embodiment of the present disclosure. Shown in FIG. 1B are label 100 bounded by leading edge 102, trailing edge 106, and side edges 104, 108. Removable region 122 also is shown in FIG. 1B, bounded by lines of weakness 110, 112, 114, 116, 118, 120. Frame region 124 also is shown in FIG. 1B, comprising the area of label 100 outside of lines of weakness 110, 112, 114, 116, 118, 120, but within leading edge 102, trailing edge 106, and side edges 104, 108. As shown in FIG. 1B, removable region 122 comprises removable region lower surface 122B. As shown in FIG. 1B, frame region 124 comprises frame region lower surface 124B. As shown in FIG. 1B, frame region lower surface 124B is at least partially covered with adhesive 126, while removable region lower surface 122B has reduced adhesive properties or may be completely free of adhesive. In at least one other embodiment of the present disclosure, removable region lower surface 122B is covered with a liner material (not shown), which liner material is free of adhesive on its exposed side. In at least one other embodiment of the present disclosure, removable region lower surface 122B and frame region lower surface 124B are covered with adhesive 126. In at least one embodiment of the present disclosure, label 100 is provided on a carrier (not shown), wherein adhesive 126 on frame region lower surface 124B is removably adhered to the carrier. For example, such a carrier may be a silicone coated liner material of a type known in the art, and adhesive 126 may be of a type that removably adheres to a silicone coated liner material, but also permanent or semi-permanently adheres to other surfaces. In at least one embodiment of the present disclosure, indicia is added to lower side 100B of label 100. For example, indicia may be added to removable region lower surface 122B of label 100, or to any adhesive-free area of frame region lower surface 124B of label 100, or to both removable region lower surface 122B and to any adhesive-free area of frame region lower surface 124B of label 100.

Figure 2A:
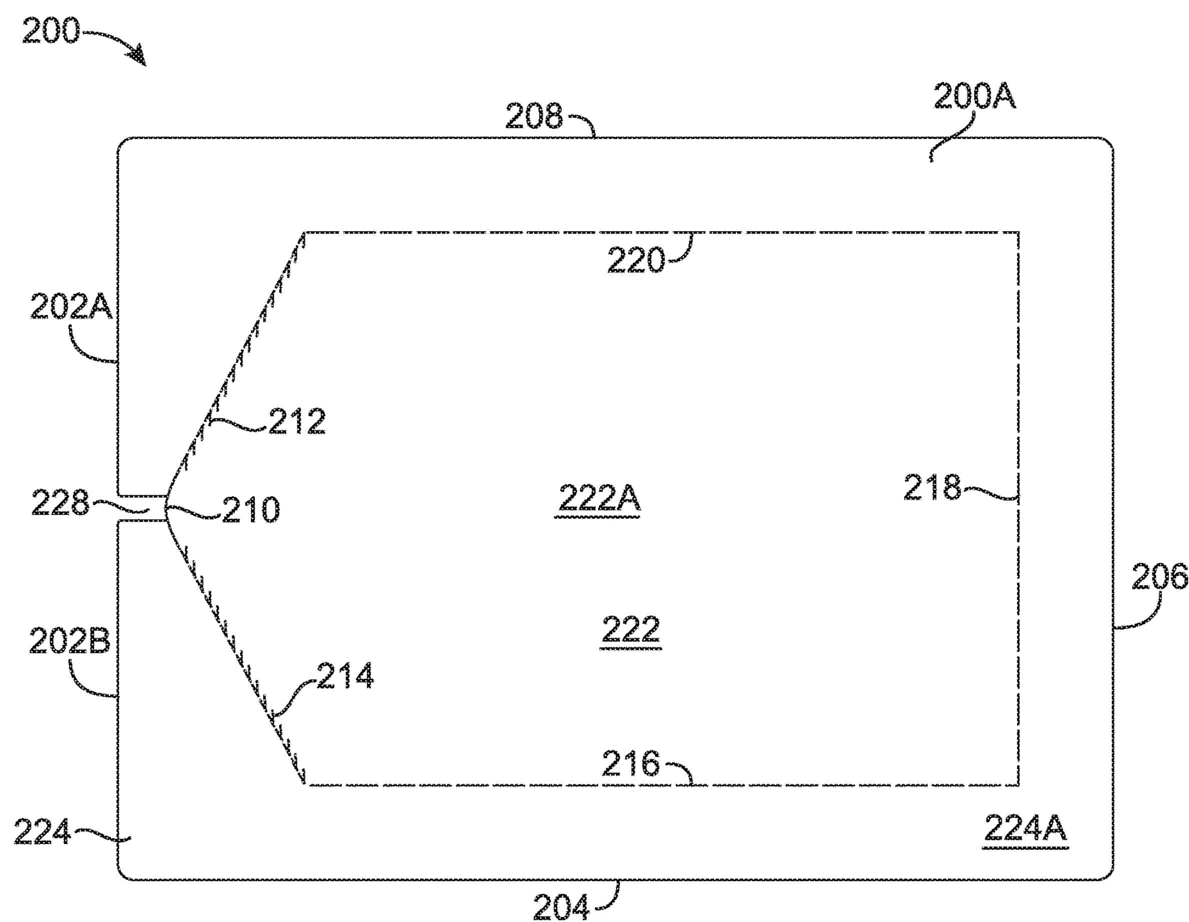
FIG. 2A shows the upper side of a label according to at least one embodiment of the present disclosure.

FIG. 2A shows upper side 200A of label 200 according, to at least one embodiment of the present disclosure. In at least one embodiment of the present disclosure, label 200 comprises a label stock material such as, for example, paper, polyester, or another polymer material. In at least one embodiment of the present disclosure, label 200 comprises a label stock material receptive to the printing of indicia thereon. For example, label 200 may be exposed to an ink jet printer, a laser printer, a thermal transfer printer, a direct thermal printer, or another type of printing device capable of applying indicia to label 200. The inks, toners, and/or other printing materials used in the application of indicia to label 200 are selected to be compatible with the printing device used to apply such indicia, the material used for label 200, and the intended use of label 200.

As shown in FIG. 2A, label 200 is bounded by leading edge 202A, 202B, trailing edge 206, and side edges 204, 208. Label 200 also comprises removable e region 222 and frame region 224. Removable region 222 comprises removable region upper surface 222A, and is bounded by lines of weakness 210, 212, 214, 216, 218, 220. Frame region 224 comprises the portion of label 200 outside of lines of weakness 210, 212, 214, 216, 218, 220, but within leading edge 202A, 202B, trailing edge 206, and side edges 204, 208. As shown in FIG. 2A, frame region 224 comprises frame region upper surface 224A. In at least one embodiment of the present disclosure, indicia is added to upper side 200A of label 200. For example, indicia may be added to removable region upper surface 222A of label 200, or to frame region upper surface 224A of label 200, or to both removable region upper surface 222A and frame region upper surface 224A of label 200.

Lines of weakness 210, 212, 214, 216, 218, 220 serve to weaken the boundary between removable region 222 and frame region 224, facilitating the removal of removable region 222 from frame region 224 as discussed hereinafter. Lines of weakness 210, 212, 214, 216, 218, 220 may comprise cuts or perforations that extend partially or completely through label 200.

In at least one embodiment of label 200, line of weakness 210 comprises a curvilinear cut that completely severs removable region 222 from frame region 224. In at least one embodiment of label 200, line of weakness 210 comprises a curvilinear cut that is the connecting an end of line of weakness 212 to an end of line of weakness 214. In the embodiment of label 200 shown in FIG. 2A, a portion of frame region 224 is removed to form notch 228. In the embodiment of label 200 shown in FIG. 2A, notch 228 exposes line of weakness 210.

In at least one embodiment of label 200, lines of weakness 212, 214 comprise a series of angular perforations generally having a V-shape or a Y-shape. The vertex of each angular perforation of line of weakness 212 is oriented in the direction of line of weakness 220, as shown in FIG. 2A. The series of angular perforations comprising line of weakness 212 is arranged so that one side of each angular perforation is substantially coincident with a line extending between an end of line of weakness 210 and an end of line of weakness 220, and the other side of each angular perforation is oriented toward removable region 222 rather than toward frame region 224. The vertex of each angular perforation of line of weakness 214 is oriented in the direction of line of weakness 216, as shown in FIG. 2A. The series of angular perforations comprising line of weakness 214 is arranged so that one side of each angular perforation is substantially coincident with a line extending between an end of line of weakness 210 and an end of line of weakness 216, and the other side of each angular perforation is oriented toward removable region 222 rather than toward frame region 224.

In at least one embodiment of label 200, the angle, between line of weakness 212 and lines of weakness 220 is greater than 90°. In at least one embodiment of label 200, the angle between line of weakness 214 and lines of weakness 216 is greater than 90°. In at least one embodiment of label 200, the angle between line of weakness 218 and line of weakness 220 is about 90°. In at least one embodiment of label 200, the angle between line of weakness 218 and line of weakness 216 is about 90°. The use of angular perforations in lines of weakness 212, 214, and the obtuse angles between line of weakness 212 and lines of weakness 220 and between line of weakness 214 and lines of weakness 216, facilitates removal of removable region 222 from frame 224 in one motion without tearing the material of removable region 222.

Figure 2B:
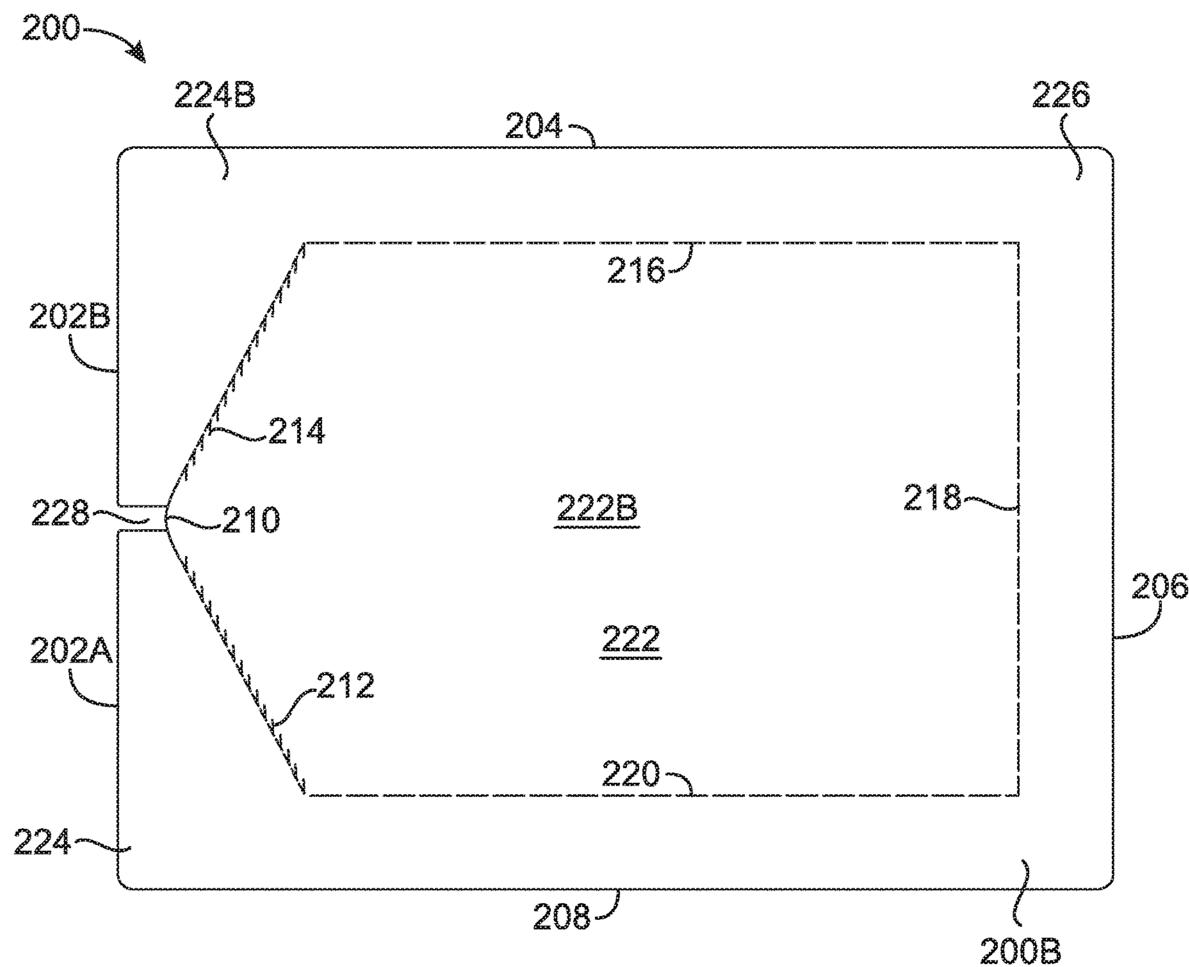
FIG. 2B shows the lower side of a label according to at least one embodiment of the present disclosure.

FIG. 2B shows lower side 200B of label 200 according to at least one embodiment of the present disclosure. Shown in FIG. 2B are label 200 bounded by leading, edge 202A, 202B, trailing edge 206, and side edges 204, 208. Removable region 222 also is shown in FIG. 2B, bounded by lines of weakness 210, 212, 214, 216, 218, 220. Frame region 224 also is shown in FIG. 2B, comprising the area of label 200 outside of lines of weakness 210, 212, 214, 216, 218, 220, but within leading edge 202A, 202B, trailing edge 206, and, side edges 204, 208. Notch 228 also is shown on FIG. 2B.

As shown in FIG. 2B, removable region 222 comprises removable region lower surface 222B. As shown in FIG. 2B, frame region 224 comprises frame region lower surface 224B. As shown in FIG. 2B, frame region lower surface 224B is at least partially covered with adhesive 226, while removable region lower surface 222B has reduced adhesive properties or may be completely free of adhesive. In at least one other embodiment of the present disclosure, removable region lower surface 222B is covered with a liner material (not shown), which liner material is free of adhesive on its exposed side. In at least one other embodiment of the present disclosure, removable region lower surface 222B and frame region lower surface 224B are covered with adhesive 226. In at least one embodiment of the present disclosure, label 200 is provided on a carrier (not shown), wherein adhesive 226 on frame region lower surface 224B is removably adhered to the carrier. For example, such a carrier may be a silicone coated liner material of a type known in the art, and adhesive 226 may be of a type that removably adheres to a silicone coated liner material, but also permanent or semi-permanently adheres to other surfaces. In at least one embodiment of the present disclosure, indicia is added to lower side 200B of label 200. For example, indicia may be added to removable region lower surface 222B of label 200, or to any adhesive-free area of frame region lower surface 224B of label 200, or to both removable region lower surface 222B and to any adhesive-free area of frame region lower surface 224B of label 200.

Figure 3A:
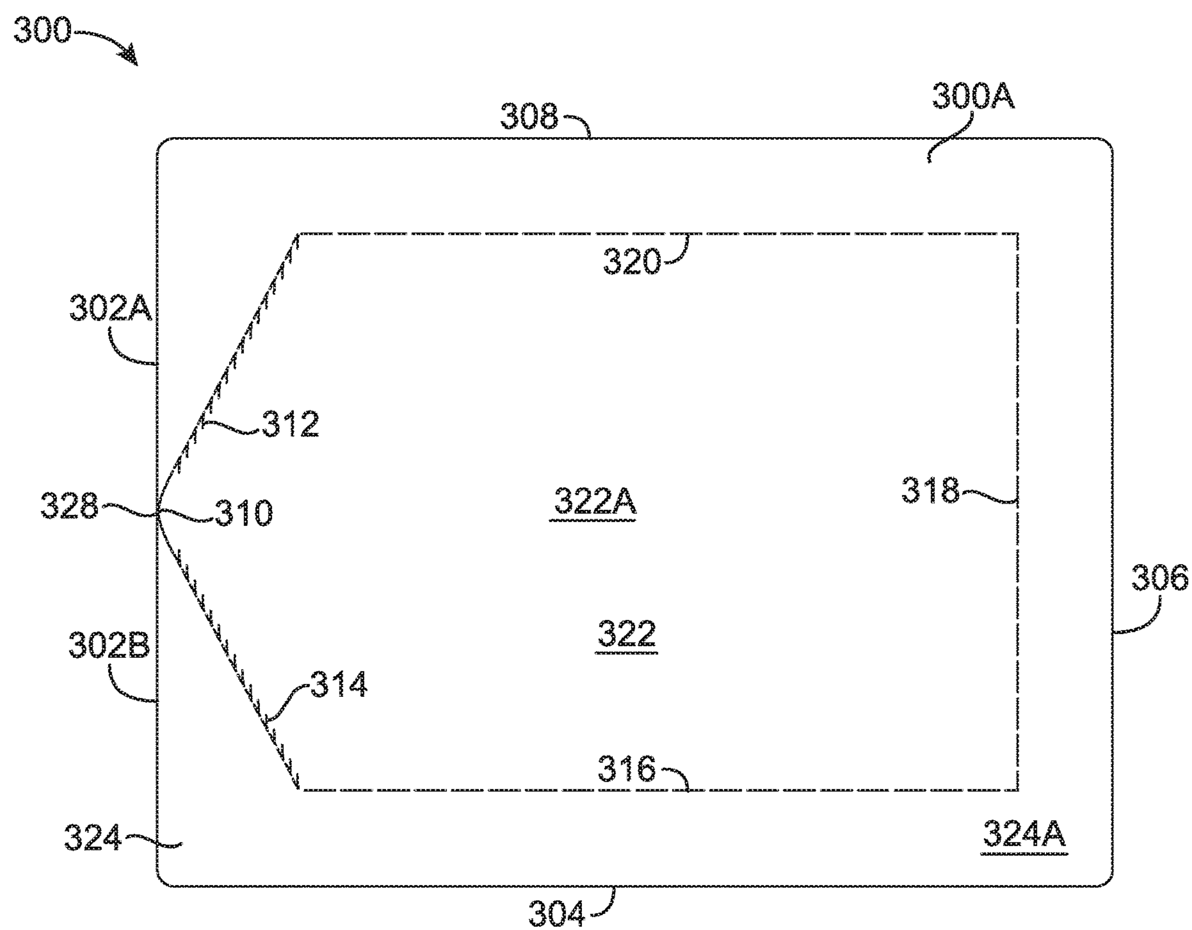
FIG. 3A shows the upper side of a label according to at least one embodiment of the present disclosure.

FIG. 3A shows upper side 300A of label 300 according to at least one embodiment of the present disclosure. In at least one embodiment of the present disclosure, label 300 comprises a label stock material such as, for example, paper, polyester, or another polymer material. In at least one embodiment of the present disclosure, label 300 comprises a label stock material receptive to the printing of indicia thereon. For example, label 300 may be exposed to an ink jet printer, a laser printer, a thermal transfer printer, a direct thermal printer, or another type of printing device capable of applying indicia to label 300. The inks, toners, and/or other printing materials used in the application of indicia to label 300 are selected to be compatible with the printing device used to apply such indicia, the material used for label 300, and the intended use of label 300.

As shown in FIG. 3A, label 300 is bounded by leading edge 302A, 302B, trailing edge 306, and side edges 304, 308. Label 300 also comprises removable region 322 and frame region 324. Removable region 322 comprises removable region upper surface 322A, and is bounded by lines of weakness 310, 312, 314, 316, 318, 320. Frame region 324 comprises the portion of label 300 outside of lines of weakness 310, 312, 314, 316, 318, 320, but within leading edge 302A, 302B, trailing edge 306, and side edges 304, 308. As shown in FIG. 3A, frame region 324 comprises frame region upper surface 324A. In at least one embodiment of the present disclosure, indicia is added to upper side 300A of label 300. For example, indicia may be added to removable region upper surface 322A of label 300, or to frame region upper surface 324A of label 300, or to both removable region upper surface 322A and frame region upper surface 324A of label 300.

Lines of weakness 310, 312, 314, 316, 318, 320 serve to weaken the boundary between removable region 322 and frame region 324, facilitating the removal of removable region 322 from frame region 324 as discussed hereinafter. Lines of weakness 310, 312, 314, 316, 318, 320 may comprise cuts or pert orations that extend partially or completely through label 300.

In at least one embodiment of label 300, line of weakness 310 comprises a curvilinear cut that completely severs removable region 322 from frame region 324. In at least one embodiment of label 300, line of weakness 310 comprises a curvilinear cut that is the connecting an end of line of weakness 312 to an end of line of weakness 314. In at least one embodiment of label 300, line of weakness 310 comprises a curvilinear cut comprising apex 328. In at least one embodiment of label 300, apex 328 of line of weakness 310 intersects leading edge 302A, 302B.

In at least one embodiment of label 300, lines of weakness 312, 314 comprise a series of angular perforations generally having a V-shape or a Y-shape. The vertex, of each angular perforation of line of weakness 312 is oriented in the direction of line of weakness 320, as shown in FIG. 3A. The series of angular perforations comprising line of weakness 312 is arranged so that one side of each angular perforation is substantially coincident with a line extending between an end of line of weakness 310 and an end of line of weakness 320, and the other side of each angular perforation is oriented toward removable region 322 rather than toward frame region 324. The vertex of each angular perforation of line of weakness 314 is oriented in the direction of line of weakness 316, as shown in FIG. 3A. The series of angular perforations comprising line of weakness 314 is arranged so that one side of each angular perforation is substantially coincident with a line extending between an end of line of weakness 310 and an end of line of weakness 316, and the other side of each angular perforation is oriented toward removable region 322 rather than toward frame region 324.

In at least one embodiment of label 300, the angle between line of weakness 312 and lines of weakness 320 is greater than 90°. In at least one embodiment of label 300, the angle between line of weakness 314 and lines of weakness 316 is greater than 90°. In at least one embodiment of label 300, the angle between line of weakness 318 and line of weakness 320 is about 90°. In at least one embodiment of label 300, the angle between line of weakness 318 and line of weakness 316 is about 90°. The use of angular perforations in lines of weakness 312, 314, and the obtuse angles between line of weakness 312 and lines of weakness 320 and between line of weakness 314 and lines of weakness 316, facilitates removal of removable region 322 from frame 324 in one motion without tearing the material of removable region 322.

Figure 3B:
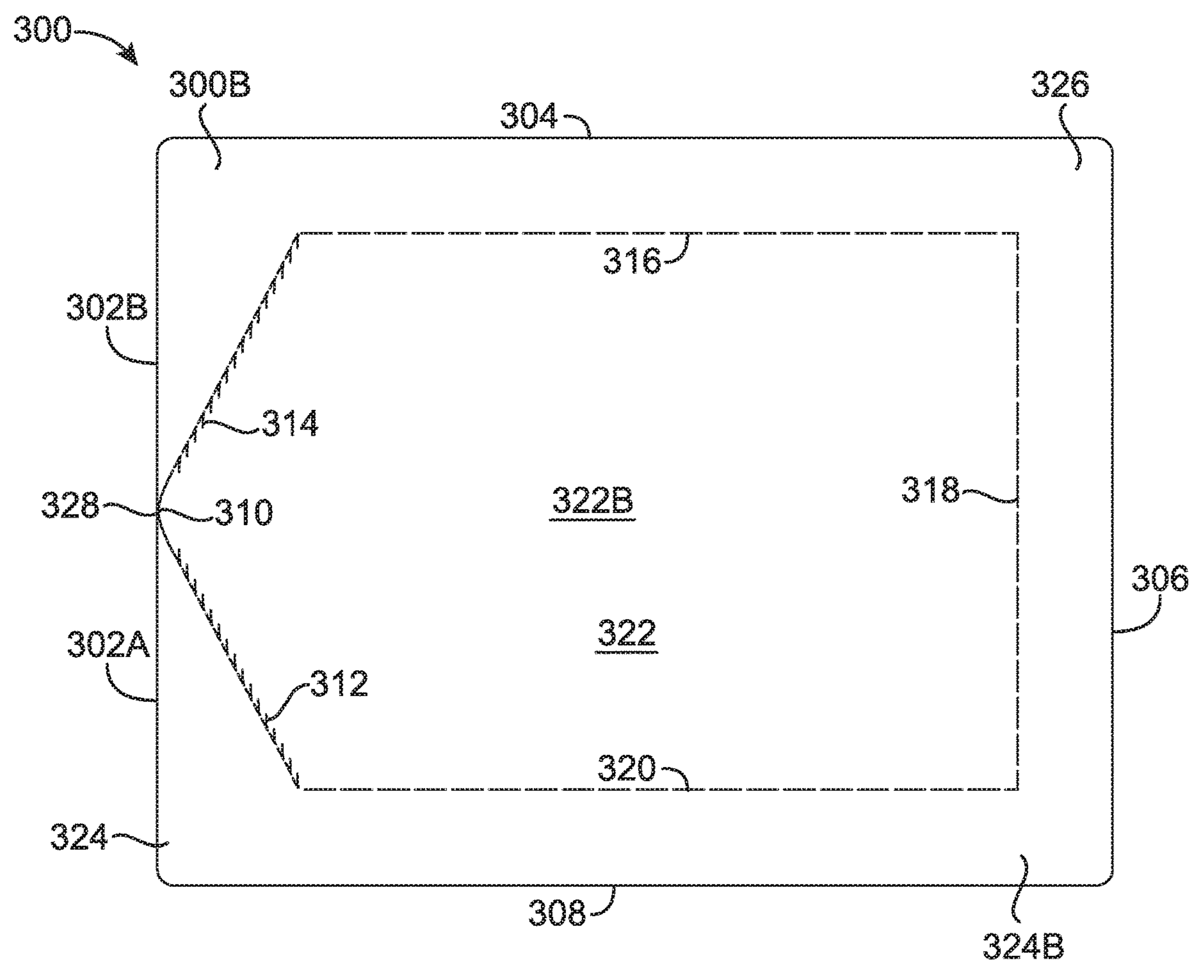
FIG. 3B shows the lower side of a label according to at least one embodiment of the present disclosure.

FIG. 3B shows lower side 300B of label 300 according to at least one embodiment of the present disclosure. Shown in FIG. 3B are label 300 bounded by leading edge 302A, 302B, trailing edge 306, and side edges 304, 308. Removable region 322 also is shown in FIG. 3B, bounded by lines of weakness 310, 312, 314, 316, 318, 320. Frame region 324 also is shown in FIG. 3B, comprising the area of label 300 outside of lines of weakness 310, 312, 314, 316, 318, 320, but within leading edge 302A, 3028, trailing edge 306, and side edges 304, 308. Apex 328 of line of weakness 310 also is shown on FIG. 3B.

As shown in FIG. 3N, removable region 322 comprises removable region lower surface 322B. As shown in FIG. 3B, frame region 324 comprises frame region lower surface 324B. As shown in FIG. 3B, frame region lower surface 324B is at least partially covered with adhesive 326, while removable region lower surface 322B has reduced adhesive properties or may be completely free of adhesive. In at least one other embodiment of the present disclosure, removable region lower surface 322B is covered with a liner material (not shown), which liner material is free of adhesive on its exposed side. In at least one other embodiment of the present disclosure, removable region lower surface 32B and frame region lower surface 324B are covered with adhesive 326. In at least one embodiment of the present disclosure, label 300 is provided on a carrier (not shown), wherein adhesive 326 on frame region lower surface 324B is removably adhered to the carrier. For example, such a carrier may be a silicone coated liner material of a type known in the art, and adhesive 326 may be of a type that removably adheres to a silicone coated liner material, but also permanent or semi-permanently adheres to other surfaces. In at least one embodiment of the present disclosure, indicia is added to lower side 300B of label 300. For example, indicia may be added to removable region lower surface 322B of label 300, or to any adhesive-free area of frame region lower surface 324B of label 300, or to both removable region lower surface 322B and to any adhesive-free area of frame region lower surface 324B of label 300.

Figure 4:
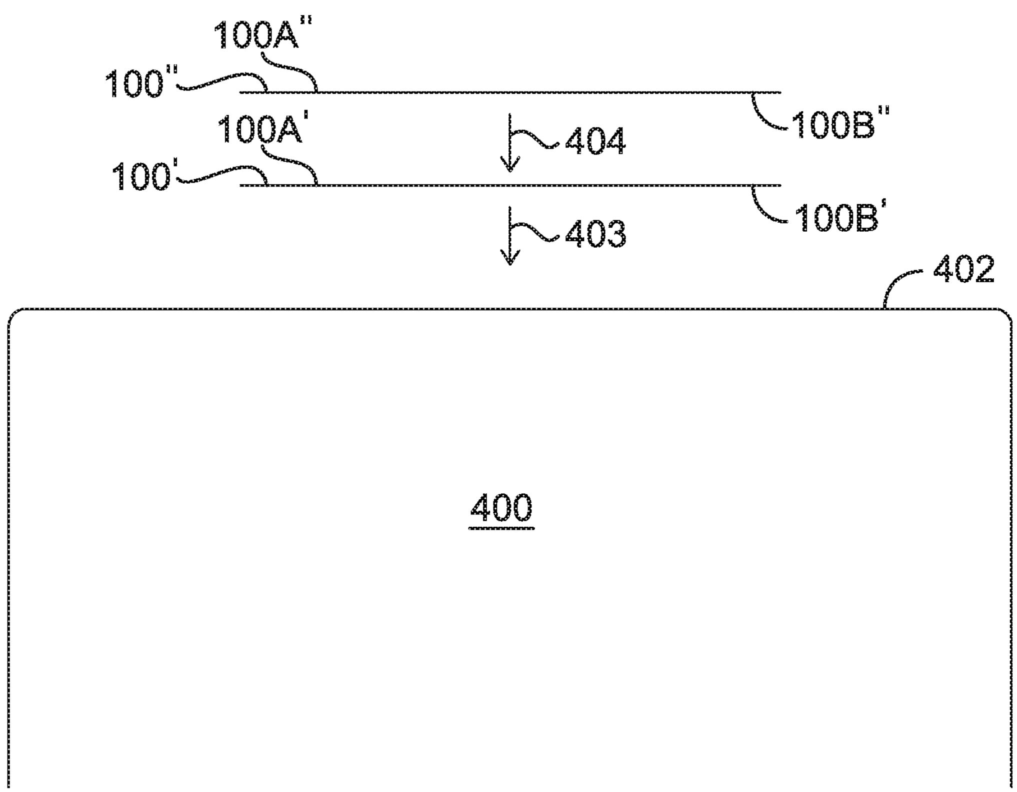
FIG. 4 shows two labels applied to a carton, according to at least one embodiment of the present disclosure.

FIG. 4 shows the application of label 100 to carton 400 according to at least one embodiment of the present disclosure. As shown in FIG. 4, according to at least one embodiment of the present disclosure a pair of labels 100 (identified as lower label 100' and upper label 100" in FIG. 4) are applied to carton 400, either mechanically (such as, for example, by a label applicator apparatus) or by hand.

In at least one embodiment of the present disclosure, prior to or in conjunction with the application of lower label 100' to carton 400, indicia is added to removable region upper surface 122A of lower label 100'. For example, where lower label 100' is intended to serve as a packing list, such indicia may comprise the contents of carton 400.

For purposes of applying lower label 100' to carton 400, lower label 100' is oriented such that lower side 100B' of lower label 100' faces carton 400. Lower label 100' is moved in the direction shown by arrow 403 until adhesive 126 on lower side 100B' of lower label 100' comes into contact with upper surface 402 of carton 400. Adhesive 126 on lower side 100B' of lower label 100' permanent or semi-permanently adheres frame region lower surface 124B of lower label 100' to upper surface 402 of carton 400. Removable region lower surface 122B of lower label 100' also is adjacent to upper surface 402 of carton 400, but because removable region lower surface 122B of lower label 100' has reduced adhesive properties or may be completely free of adhesive, removable region lower surface 122B of lower label 100' does not adhere to upper surface 402 of carton 400.

In at least one embodiment of the present disclosure, upper label 100" is applied over, and in registration with, lower label 100'. In at least one embodiment, prior to or in conjunction with the application of upper label 100" to carton 400, indicia is added to upper side 100A" of upper label 100", such as within removable region upper surface 122A of upper label 100". For example, where upper label 100" is intended to serve as a shipper label, such indicia may comprise the address to which carton 400 is to be shipped, a return address, bar codes, maxicodes, identifying numbers, and the like.

For purposes of applying upper label 100" to lower label 100', upper label 100" is oriented such that lower side 100B" of upper label 100" faces upper side 100A' upper side 100A'. Upper label 100" is moved in the direction shown by arrow 404 until adhesive 126 on lower side 100B" of upper label 100" comes into contact with upper side 100A' of lower label 100'. Adhesive 126 on lower side 100B" of upper label 100" permanent or semi-permanently adheres frame region lower surface 124B of upper label 100" to frame region upper surface 124A of lower label 100'. Removable region lower surface 122B of upper label 100" also is adjacent to, and in registration with, removable region upper surface 122A of lower label 100', but because removable region lower surface 122B of upper label 100" has reduced adhesive properties or may be completely free of adhesive, removable region lower surface 122B of upper label 100" does not adhere to removable region upper surface 122A of lower label 100'.

It also is within the scope of the present disclosure that upper label 100" may be adhered to lower label 100' in the manner described above before lower label 100' is applied to upper surface 402 of carton 400. In such an embodiment, after upper label 100" is adhered to lower label 100', the adhered-together labels 100 then are applied simultaneously to carton 400.

After being presented with this disclosure, those skilled in the art will appreciate that a pair of labels 200 or a pair of labels 300 may be applied to a shipping carton 400 in the same manner as described above with respect to the pair of labels 100.

A person in possession of carton 400 (such as the recipient of carton 400) with the pair of labels 100 adhered thereto may remove removable region 122 of upper label 100" to reveal removable region 122 of lower label 100'. For example, a person in possession of carton 400 (such as the recipient of carton 400) may be interested in knowing the contents of carton 400, and removable region 122 of lower label 100' may be a packing list comprising indicia that reveals the contents of carton 400.

In at least one embodiment, because removable region 122 of upper label 100' is not adhered to lower label 100', removable region 122 of upper label 100" may be removed from frame region 124 of upper label 100" by first separating removable region 122 of upper label 100" from frame region 124 of upper label 100" at line of weakness 110, such as by inserting a fingernail or other implement through line of weakness 110 and lifting the portion of removable region 122 of upper label 100" adjacent line of weakness 110. After the portion of removable region 122 adjacent line of weakness 110 is separated from frame region 124, the remainder of removable region 122 of upper label 100" may be separated from frame region 124 of upper label 100" along lines of weakness 112, 114, 116, 118, 120, and, if desired, fully removed from upper label 100". Frame region 124 of upper label 100" remains adhered to lower label 100'.

Similarly, in at least one embodiment, because removable region 122 of lower label 100" is not ad tiered to carton 400, removable region 122 of lower label 100 may be removed from frame region 124 of lower label 100' by first separating removable region 122 of lower label 100' from frame region 124 of lower label 100' at line of weakness 110, such as by inserting a fingernail or other implement through line of weakness 110 and lifting the portion of removable region 122 of lower label 100' adjacent line of weakness 110. After the portion of removable region 122 adjacent line of weakness 110 is separated from frame region 124, the remainder of removable region 122 of lower label 100 may be separated from frame region 124 of lower label 100' along lines of weakness 112, 114, 116, 118, 120, and, if desired, fully removed from lower label 100'. Frame region 124 of lower label 100' remains adhered to carton 400.

Figure 5:
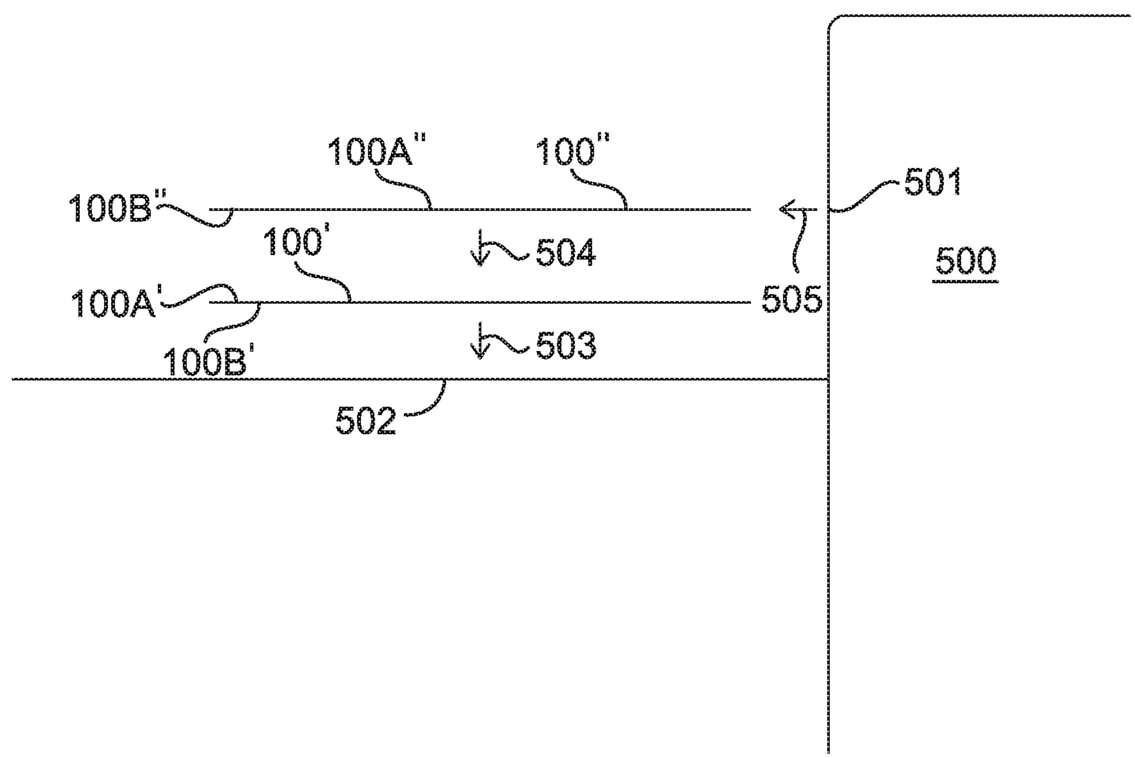
FIG. 5 shows two labels dispensed from a label printer onto a receptacle for future application to a surface, according to at least one embodiment of the present disclosure.

FIG. 5 shows the dispensing of label 100 from label printer 500 according to at least one embodiment of the present disclosure. Shown in FIG. 5 is label printer 500, comprising a printing mechanism (not shown), dispensing mechanism 501, and receptacle 502. Label printer 500 may comprise an ink jet printer, a laser printer, a thermal transfer printer, a direct thermal printer, or another type of printing device capable of applying indicia to each label 100. Receptacle 502 may be constructed of rigid material selected for the purpose of receiving labels 100 dispensed from label printer 500, such as, for example, stainless steel, aluminum, fiberglass, or a plastic material. According to at least one embodiment of the present disclosure, receptacle 502 is horizontal or substantially horizontal. In, other embodiments receptacle 502 may be oriented at an inclining or declining angle. As shown in FIG. 5, according to at least one embodiment of the present disclosure, a plurality of labels 100 are provided to label printer 500 on a carrier (not shown). For example, a plurality of labels 100 are removably adhered to carrier material in a rolled configuration or in a fan-folded configuration, and are supplied to label printer 500 in a manner anticipating printing by and dispensing from label printer 500. As shown in FIG. 5, two labels 100 (identified as lower label 100' and upper label 100" in FIG. 5) are dispensed in sequence from label printer 500. The pair of labels 100 are dispensed by dispensing mechanism 501 of label printer 500, such that each label 100 is separated from the carrier material and released from label printer 500 in the direction of arrow 505, and then come to rest, in registration with one another, on receptacle 502 of label printer 500. Thereafter, the pair of labels 100, in registration with one another and adhered together, can be retrieved from receptacle 502, either mechanically (such as, for example, by a label applicator apparatus) or by hand, and applied to a surface (such as, for example, upper surface 402 of carton 400), either mechanically (such as, for example, by a label applicator apparatus) or by hand.

In at least one embodiment of the present disclosure, prior to or in conjunction with the dispensing of lower label 100' onto receptacle 502 of label printer 500, indicia is added to removable region upper surface 122A of lower label 100' by the printing mechanism (not shown) of label printer 500. For example, where lower label 100' is intended to serve as a packing list, such indicia may comprise the contents of a container to which label 100' will be adhered, such as carton 400.

Lower label 100' is dispensed from label printer 500 such that lower side 100B' of lower label 100' faces receptacle 502 of label printer 500. Lower label 100' moves in the direction shown by arrow 503 until lower side 100B' of lower label 100' comes into contact with receptacle 502 of label printer 500. Because no pressure is exerted on upper side 100A' of lower label 100', adhesive 126 on lower side 100B' of lower label 100' does not adhere frame region lower surface 124B of lower label 100' to receptacle 502 of label printer 500. In at least one embodiment, receptacle 502 comprises a non-stick surface that retards adherence of adhesive 126 to receptacle 502. Removable region lower surface 122B of lower label 100' also is adjacent to receptacle 502 of label printer 500, but because removable region lower surface 122B of lower label 100' has reduced adhesive properties or may be completely free of adhesive, removable region lower surface 122B of lower label 100' also does not adhere to receptacle 502 of label printer 500.

In at least one embodiment of the present disclosure, upper label 100" then is dispensed from label printer 500. Upper label 100" alights on top of, and in registration with, lower label 100'. In at least one embodiment, prior to or in conjunction with the dispensing of upper label 100 onto receptacle 502 of label printer 500, indicia is added to upper side 100A" of upper label 100", such as within removable region upper surface 122A of upper label 100", by the printer mechanism (not shown) of label printer 500. For example, where upper label 100" is intended to serve as a shipping label, such indicia may comprise the address to which a container to which label 100' will be adhered, such as carton 400, is to be shipped, a return address, bar codes, maxicodes, identifying numbers, and the like.

Upper label 100" is dispensed from label printer 500 such that lower side 100B" of upper label 100" faces upper side 100A' upper side 100A'. Upper label 100" moves in the direction shown by arrow 504 until adhesive 126 on lower side 100B" of upper label 100" comes into contact with upper side 100A' of lower label 100'. Adhesive 126 on lower side 100B" of upper label 100" adheres frame region lower surface 124B of upper label 100" to frame region upper surface 124A of lower label 100' to a sufficient degree that the pair of labels can be handled as a unit, either mechanically (such as, for example, by a label applicator apparatus) or by hand. Removable region lower surface 122B of upper label 100" also is adjacent to, and in registration with, removable region upper surface 122A of lower label 100', but because removable region lower surface 122B of upper label 100" has reduced adhesive properties or may be completely free of adhesive, removable region lower surface 122B of upper label 100" does not adhere to removable region upper surface 122A of lower label 100'. In such an embodiment, after upper label 100" is adhered to lower label

100', the adhered-together labels 100 then are applied simultaneously to a surface, such as a upper surface 402 of carton 400, either mechanically (such as, for example, by a label applicator apparatus) or by hand.

Figure 6:
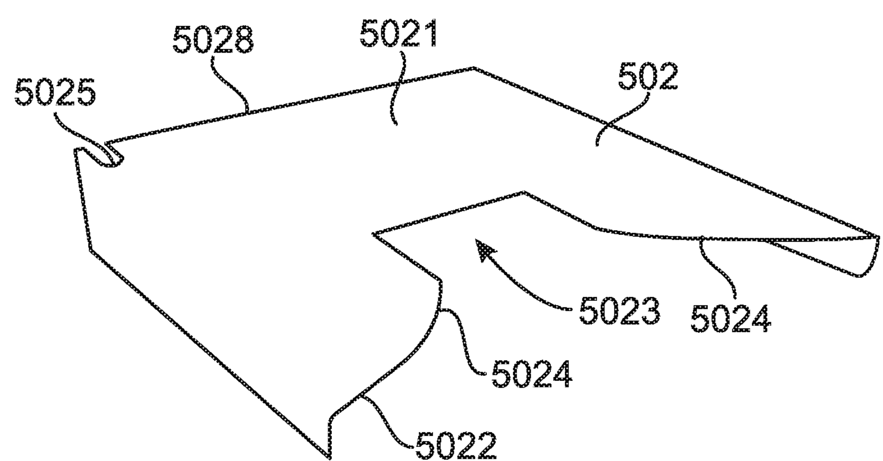
FIG. 6 shows a perspective view of a multi-layer label assembly apparatus receptacle according to at least one embodiment of the present disclosure.

FIG. 6 shows a perspective view of receptacle 502 according to at least one embodiment of the present disclosure. As shown in FIG. 6, receptacle 502 comprises upper surface 5021, opposing bottom surface 5022, distal edge 5024, and proximal edge 5028. In at least one embodiment of the present disclosure, distal edge 5024 comprises contouring that defines notched area 5023 of receptacle 502. The embodiment of receptacle 502 shown in FIG. 6 further comprises void 5025 adjacent to proximal edge 5028. In at least one embodiment, upper surface 5021 of receptacle 502 comprises non-stick properties that retard adherence of adhesive to receptacle 502, such as, for example, a non-stick coating or a non-stick tape.

Figure 7:
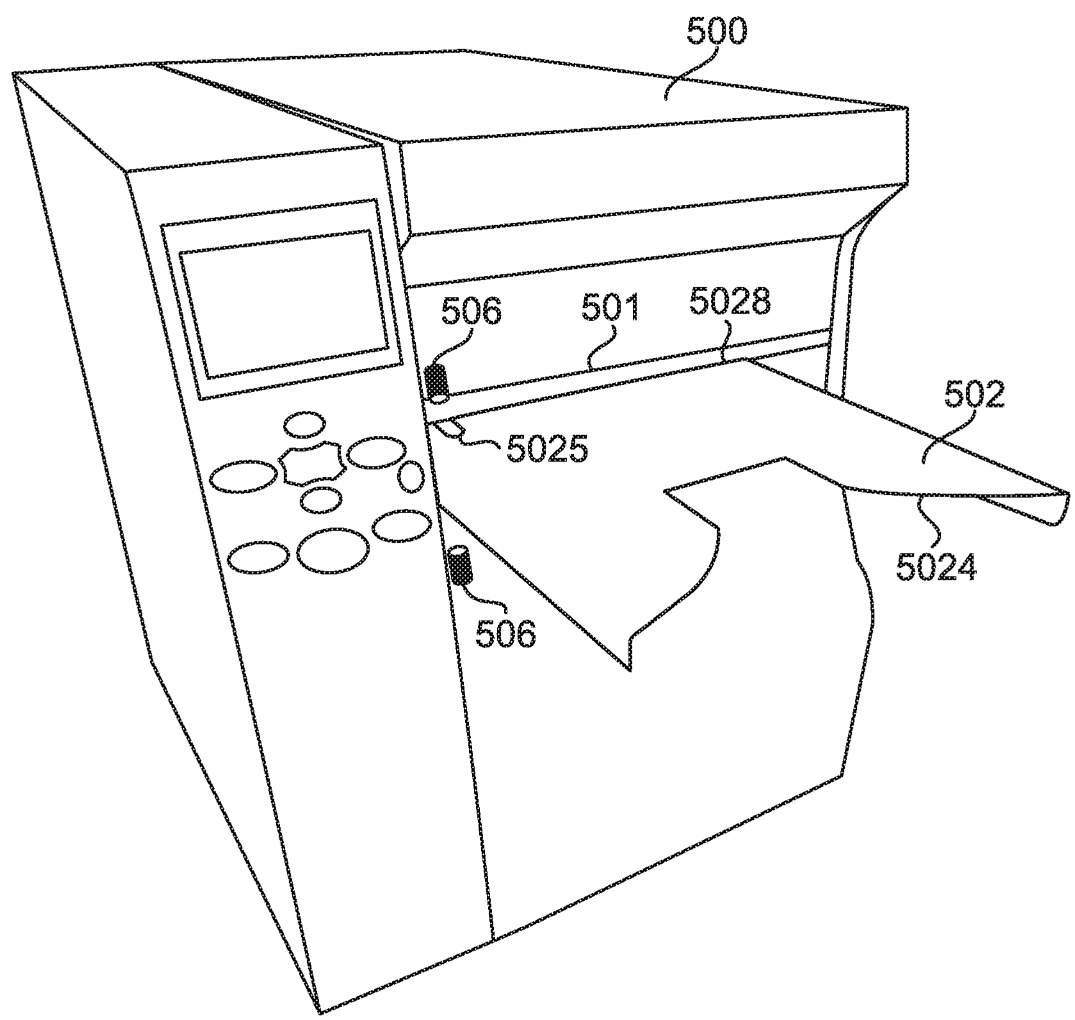
FIG. 7 shows a perspective view of a multi-layer label assembly apparatus according to at least one embodiment of the present disclosure.

FIG. 7 shows a perspective view of an embodiment of receptacle 502 affixed to label printer 500 in a horizontal or substantially horizontal configuration. A substantially horizontal configuration means that when a first label and a second label (such as lower label 100' and upper label 100") are dispensed by dispensing mechanism 501 of label printer 500 and alights on upper surface 5021 of receptacle 502 as discussed herein, gravity acting on the labels does not cause the labels to slide toward either proximal edge 5028 or distal edge 5024 of receptacle 502 (noting that the labels also do not adhere to upper surface 5021 of receptacle 502).

As shown in FIG. 7, proximal edge 5028 is adjacent to dispensing mechanism 501 of label printer 500. Also shown in FIG. 7 is label presence sensor 506 of label printer 500. As shown in FIG. 7, when receptacle 502 is affixed to label printer 500, void 5025 is aligned with label presence sensor 506 so as enable proper operation of label presence sensor 506.

Figure 8:
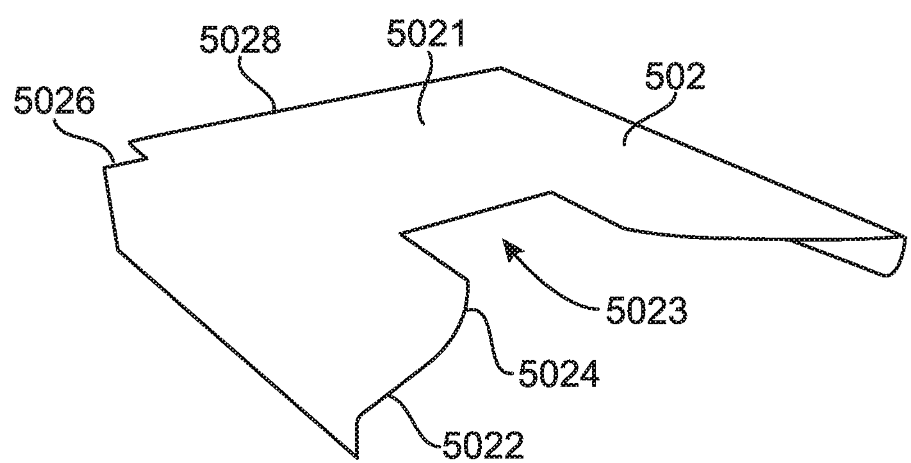
FIG. 8 shows a perspective view of a multi-layer label assembly apparatus receptacle according to at least one embodiment of the present disclosure.

FIG. 8 shows a perspective view of receptacle 502 according to at least one embodiment of the present disclosure. As shown in FIG. 8, receptacle 502 comprises upper surface 5021, opposing bottom surface 5022, distal edge 5024, and proximal edge 5028. In at least one embodiment of the present disclosure, distal edge 5024 comprises contouring that defines notched area 5023 of receptacle 502. The embodiment of receptacle 502 shown in FIG. 8 further comprises corner void 5026 adjacent to proximal edge 5028. In at least one embodiment, upper surface 5021 of receptacle 502 comprises non-stick properties that retard adherence of adhesive to receptacle 502, such as, for example, a non-stick coating or a non-stick tape.

Figure 9:
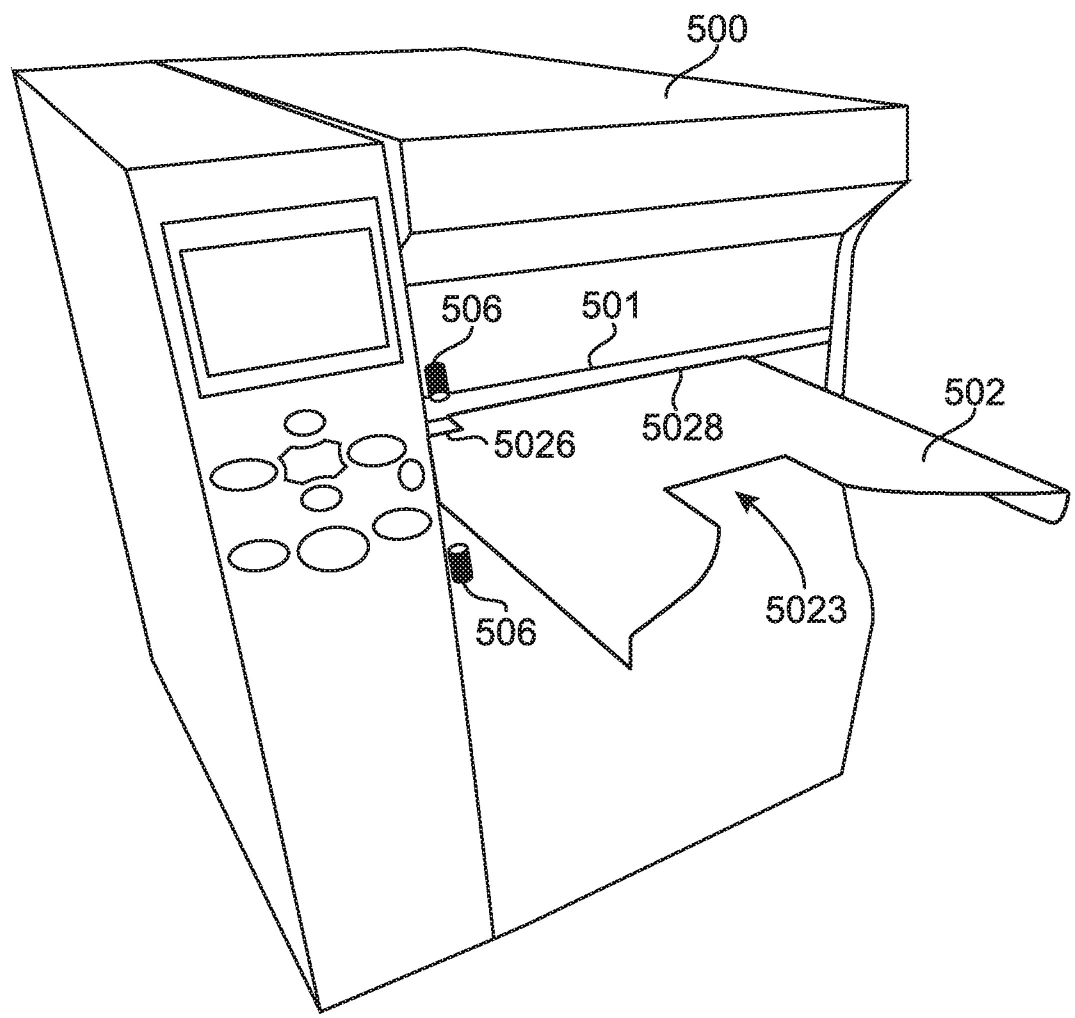
FIG. 9 shows a perspective view of a multi-layer label assembly apparatus according to at least one embodiment of the present disclosure.

FIG. 9 shows a perspective view of an embodiment of receptacle 502 affixed to label printer 500 in a horizontal or substantially horizontal configuration. As shown in FIG. 9, proximal edge 5028 is adjacent to dispensing mechanism 501 of label printer 500. Also shown in FIG. 9 is label presence sensor 506 of label printer 500. As shown in FIG. 9, when receptacle 502 is affixed to label printer 500, corner void 5026 is aligned with label presence sensor 506 so as enable proper operation of label presence sensor 506.

Figure 10:
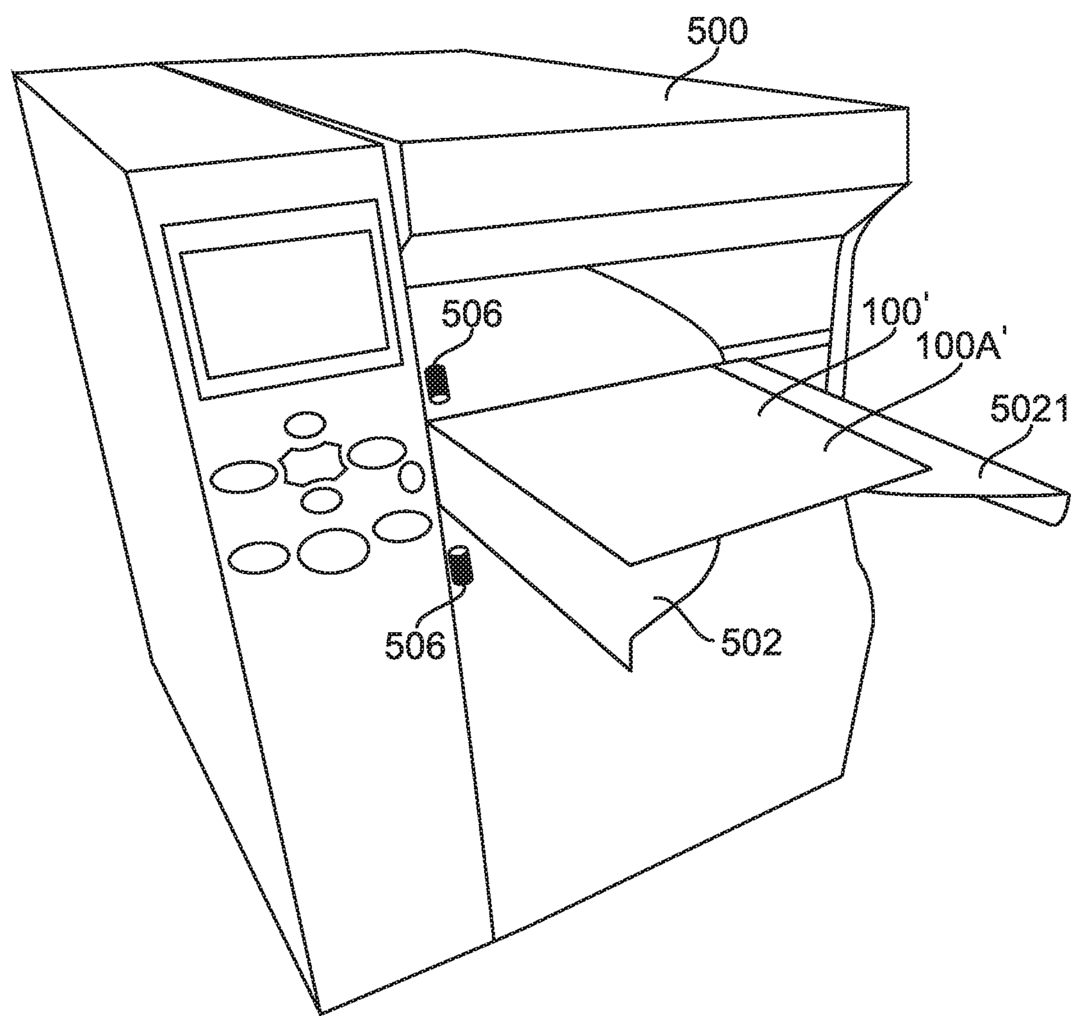
FIG. 10 shows a perspective view of a multi-layer label assembly apparatus according to at least one embodiment of the present disclosure.

FIG. 10 shows a perspective view of label printer 500 with receptacle 502 affixed thereto, while label printer 500 is in operation. In at least one embodiment, a plurality of labels 100 are removably adhered to carrier material in a rolled configuration or in a fan-folded configuration, and are supplied to label printer 500 in a manner anticipating printing by and dispensing from label printer 500. In at least one embodiment, a plurality of labels 100 are of a linerless design with no carrier material, and are supplied to label printer 500 in a manner anticipating printing by and dispensing from label printer 500. As shown in FIG. 10, lower label 100' is dispensed by dispensing mechanism 501 of label printer 500 and alights on upper surface 5021 on receptacle 502. As shown in FIG. 10, at least a portion of lower label 100' extends over distal edge 5024 of receptacle 502. Lower side 100B' of lower label 100', which bears adhesive on at least a portion thereof, faces upper surface 5021 of receptacle 502. In at least one other embodiment of the present disclosure, all or substantially all of lower side 100B' of lower label 100' is covered with adhesive. Because upper surface 5021 of receptacle 502 comprises non-stick properties, adhesive on lower side 100B' of lower label 100' does not adhere to upper surface 5021. As shown in FIG. 10, upper side 100A' of lower label 100' is exposed.

Figure 11:
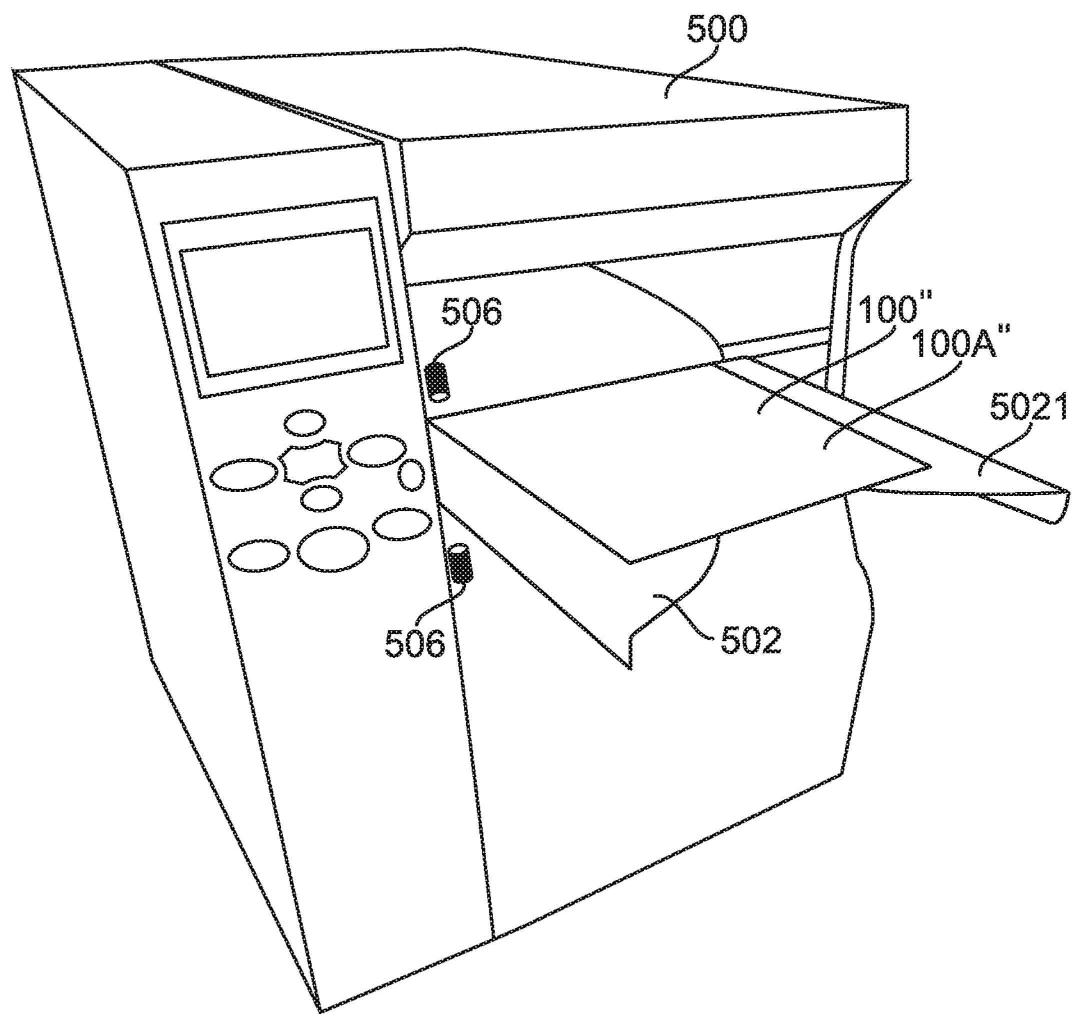
FIG. 11 shows a perspective view of a multi-layer label assembly apparatus according to at least one embodiment of the present disclosure.

FIG. 11 shows a perspective view of label printer 500 with receptacle 502 affixed thereto, while label printer 500 continues in operation. As shown in FIG. 11, upper label 100" is dispensed by dispensing mechanism 501 of label printer 500 and alights on top of, and in registration with, lower label 100'. The labels 100, comprising upper label 100" on top of, and in registration with, lower label 100', extend over notched area 5023 of receptacle 502. As shown in FIG. 11, upper side 100A" of upper label 100" is exposed. Lower side 100B" of upper label 100", which bears adhesive on at least a portion thereof, is adhered to upper side 100A' of lower label 100' to a sufficient degree that the adhered-together labels 100 comprising upper label 100" in registration with lower label 100' can be handled as a unit, either mechanically (such as, for example, by a label applicator apparatus) or by hand. In at least one embodiment of the present disclosure, the adhered-together labels 100 may be removed from label receptacle 502 either mechanically (such as, for example, by a label applicator apparatus) or by hand, by grasping the portion of the adhered-together labels 100 in the region of the adhered-together labels 100 that extends over distal edge 5024 of receptacle 502.

Figure 12:
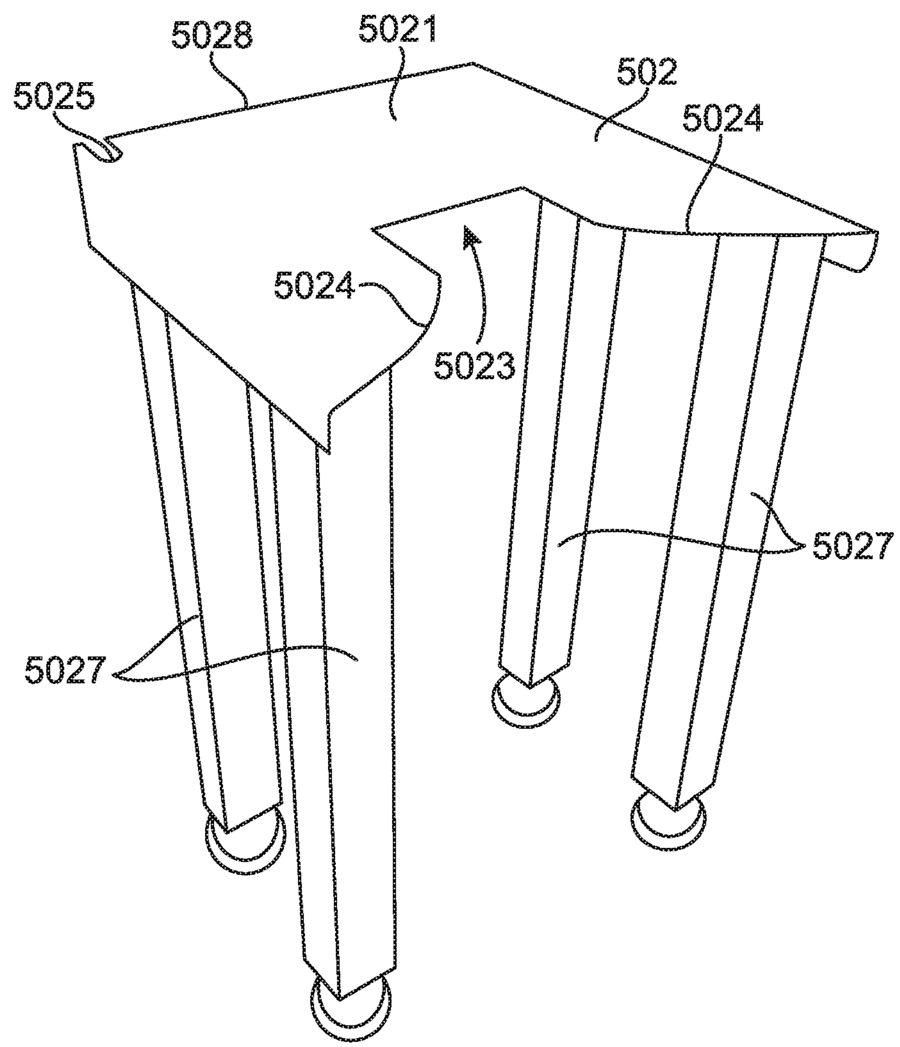
FIG. 12 shows a perspective view of a multi-layer label assembly apparatus receptacle according to at least one embodiment of the present disclosure.

FIG. 12 shows a perspective view of receptacle 502 according to at least one embodiment of the present disclosure. As shown in FIG. 12, receptacle 502 comprises upper surface 5021, opposing bottom surface 5022, distal edge 5024, legs 5027, and proximal edge 5028. Legs 5027 are mechanically connected to bottom surface 5022 of receptacle 502. In at least one embodiment of the present disclosure, distal edge 5024 comprises contouring that defines notched area 5023 of receptacle 502. The embodiment of receptacle 502 shown in FIG. 12 further comprises void 5025 adjacent to proximal edge 5028. In at least one embodiment, upper surface 5021 of receptacle 502 comprises non-stick properties that retard adherence of adhesive to receptacle 502, such as, for example, a non-stick coating or a non-stick tape.

Figure 13:
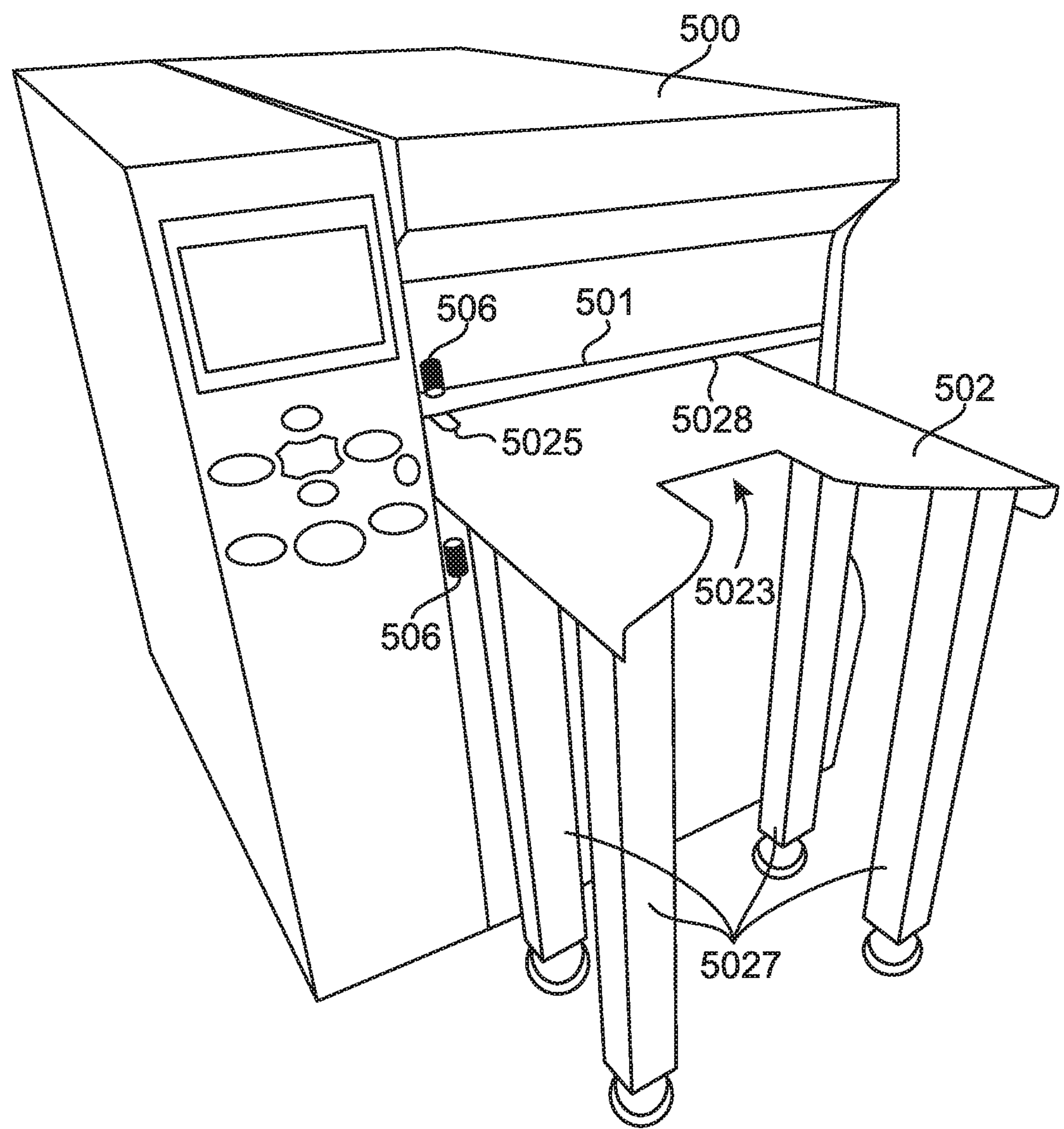
FIG. 13 shows a perspective view of a multi-layer label assembly apparatus according to at least one embodiment of the present disclosure.

FIG. 13 shows a perspective view of an embodiment of receptacle 502 used with label printer 500. As shown in FIG. 13, receptacle 502 is placed next to label printer 500, with proximal edge 5028 adjacent to dispensing mechanism 501 of label printer 500. In at least one embodiment, legs 5027 provide mechanical support to receptacle 502, so that receptacle 502 is maintained at the desired elevation and maintained in a horizontal or substantially horizontal configuration. One or more legs 5027 may be configured to adjust vertically. In the embodiment shown in FIG. 13, receptacle 502 may also be affixed to label printer 500 while legs 5027 provide mechanical support to receptacle 502. Also shown in FIG. 13 is label presence sensor 506 of label printer 500. As shown in FIG. 13, when receptacle 502 is affixed to label printer 500, void 5025 is aligned with label presence sensor 506 so as enable proper operation of label presence sensor 506.

Figure 14:
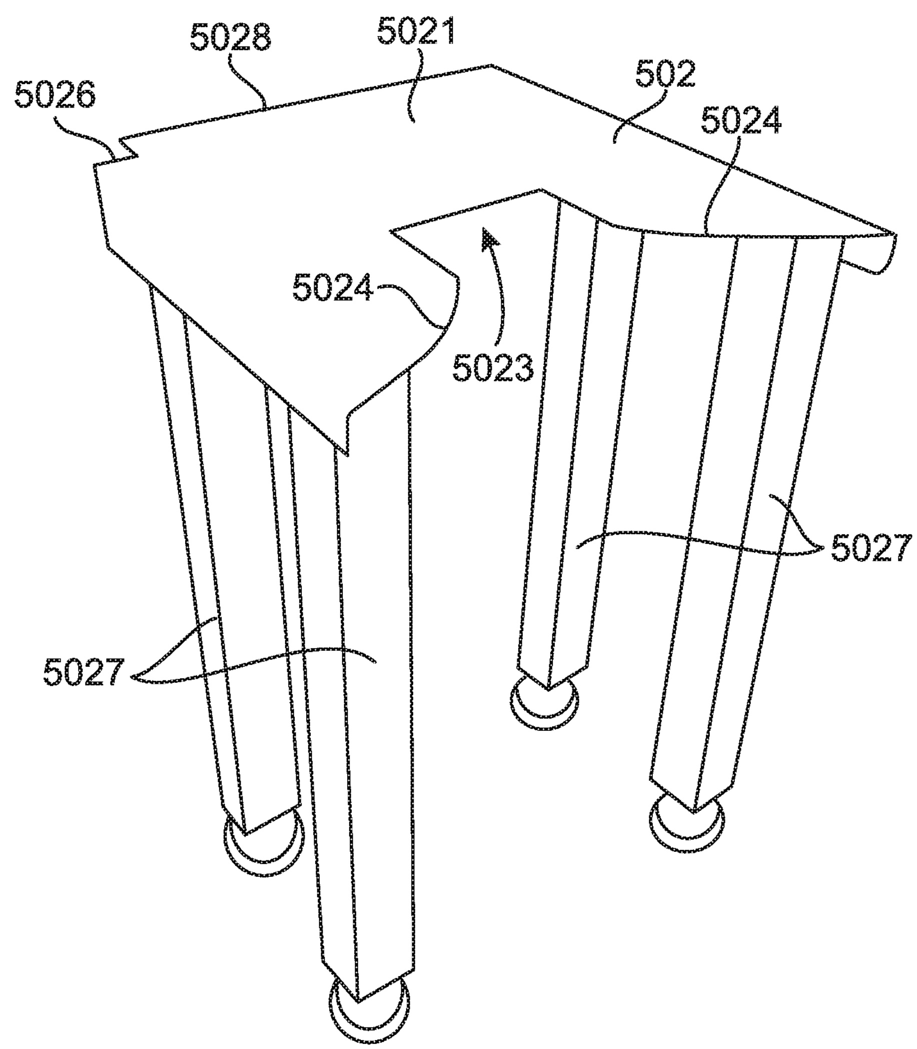
FIG. 14 shows a perspective view of a multi-layer label assembly apparatus receptacle according to at least one embodiment of the present disclosure.

FIG. 14 shows a perspective view of receptacle 502 according to at least one embodiment of the present disclosure. As shown in FIG. 14, receptacle 502 comprises upper surface 5021, opposing bottom surface 5022, distal edge 5024, legs 5027, and proximal edge 5028. Legs 5027 are mechanically connected to bottom surface 5022 of receptacle 502. In at least one embodiment of the present disclosure, distal edge 5024 comprises contouring that defines notched area 5023 of receptacle 502. The embodiment of receptacle 502 shown in FIG. 14 further comprises corner void 5026 adjacent to proximal edge 5028. In at least one embodiment, upper surface 5021 of receptacle 502 comprises non-stick properties that retard adherence of adhesive to receptacle 502, such as, for example, a non-stick coating or a non-stick tape.

Figure 15:
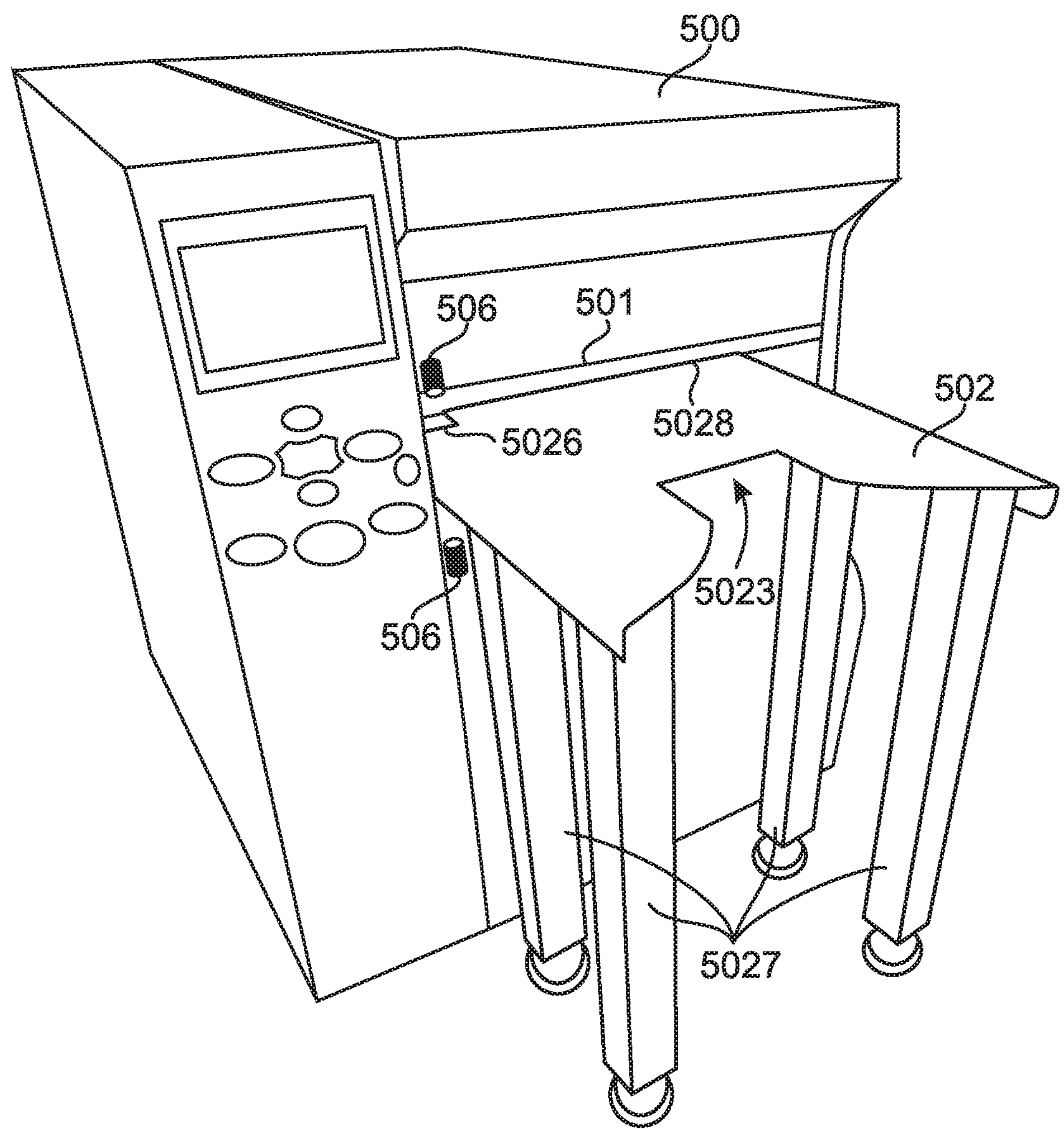
FIG. 15 shows a perspective view of a multi-layer label assembly apparatus according to at least one embodiment of the present disclosure.

FIG. 15 shows a perspective view of an embodiment of receptacle 502 used with label printer 500. As shown in FIG. 15, receptacle 502 is placed next to label printer 500, with proximal edge 5028 adjacent to dispensing mechanism 501 of label printer 500. In at least one embodiment, legs 5027 provide mechanical support to receptacle 502, so that receptacle 502 is maintained at the desired elevation and maintained in a horizontal or substantially horizontal configuration. One or more legs 5027 may be configured to adjust vertically. In the embodiment shown in FIG. 15, receptacle 502 may also be affixed to label printer 500 while legs 5027 provide mechanical support to receptacle 502. Also shown in FIG. 15 is label presence sensor 506 of label printer 500. As shown in FIG. 15, when receptacle 502 is affixed to label printer 500, corner void 5026 is aligned with label presence sensor 506 so as enable proper operation of label presence sensor 506.

Figure 16:
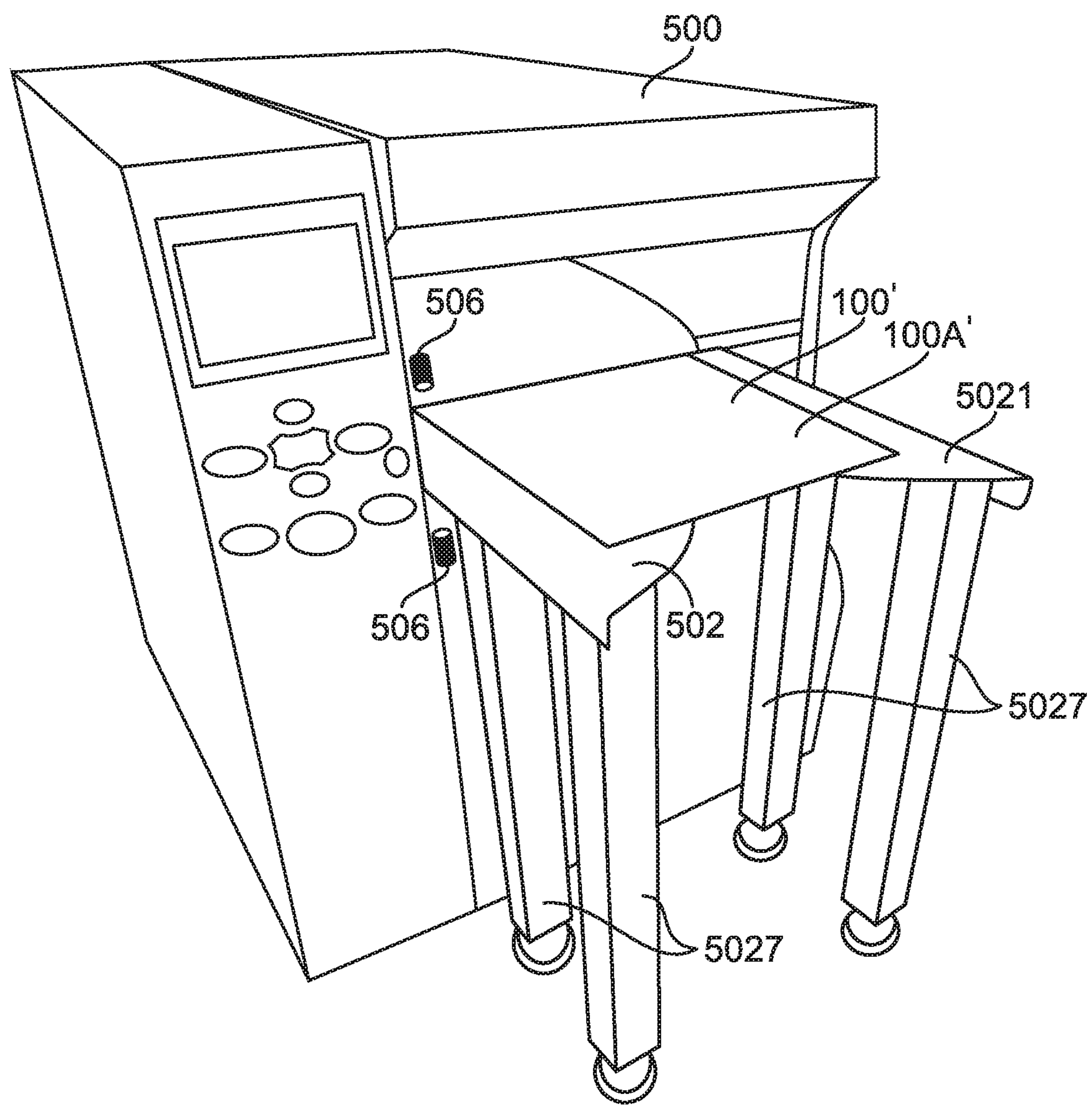
FIG. 16 shows a perspective view of a multi-layer label assembly apparatus according to at least one embodiment of the present disclosure.

FIG. 16 shows a perspective view of label printer 500 with receptacle 502 affixed thereto, while label printer 500 is in operation. In at least one embodiment, a plurality of labels 100 are removably adhered to carrier material in a rolled configuration or in a fan-folded configuration, and are supplied to label primer 500 in a manner anticipating printing by and dispensing from label printer 500. In at least one embodiment, a plurality of labels 100 are of a linerless design with no carrier material, and are supplied to label printer 500 in a manner anticipating printing by and dispensing from label printer 500. As shown in FIG. 16, lower label 100' is dispensed by dispensing mechanism 501 of label printer 500 and alights on upper surface 5021 on receptacle 502. As shown in FIG. 16, at least a portion of lower label 100' extends over distal edge 5024 of receptacle 502. Lower side 100B' of lower label 100', which bears adhesive on at least a portion, thereof, faces upper surface 5021 of receptacle 502. at least one other embodiment of the present disclosure, all or substantially all of lower side 100B' of lower label 100' is covered with adhesive. Because upper surface 5021 of receptacle 502 comprises non-stick properties, adhesive on lower side 100B' of lower label 100' does not adhere to upper surface 5021. As shown in FIG. 16, upper side 100A' of lower label 100' is exposed.

Figure 17:
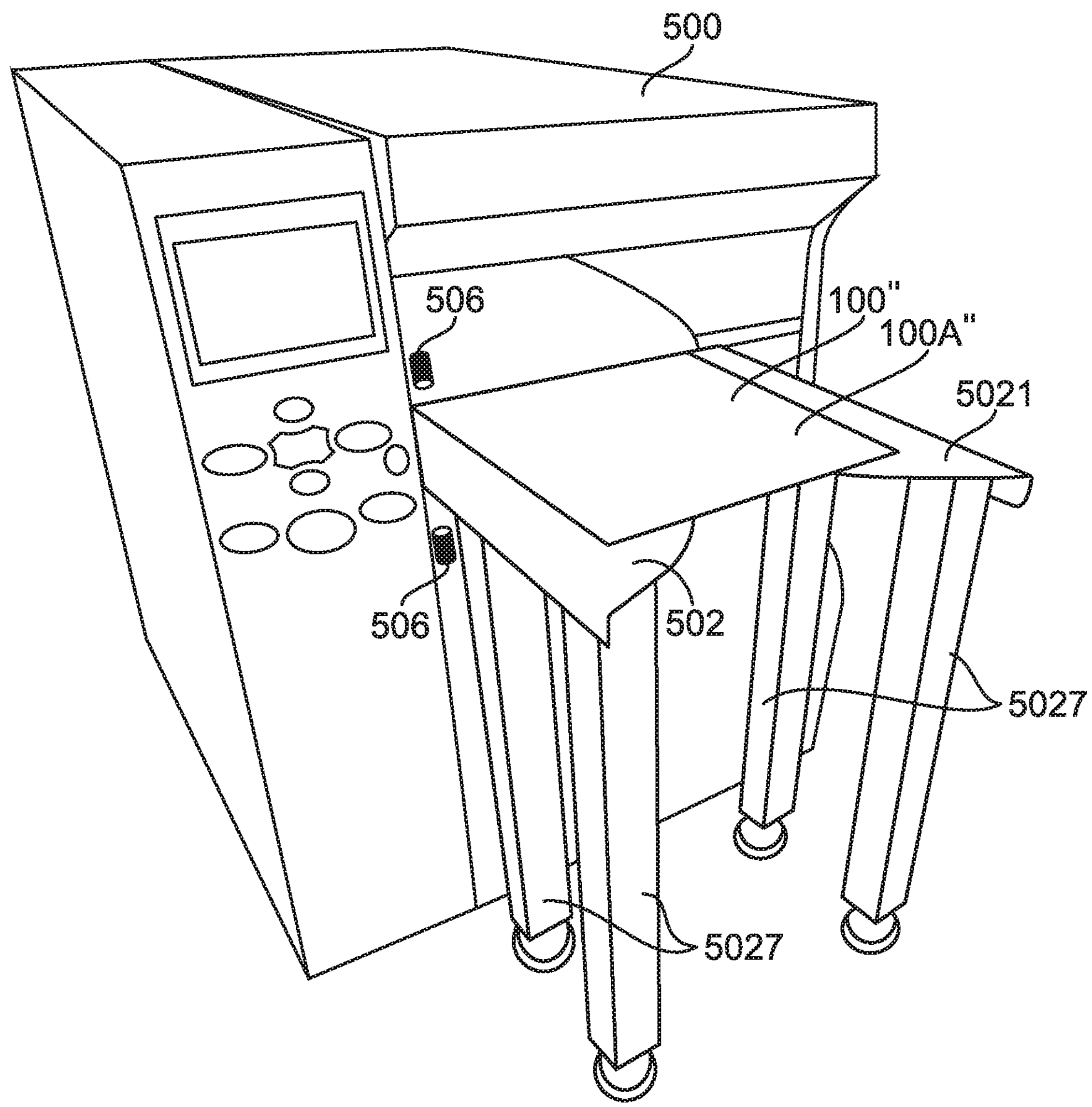
FIG. 17 shows a perspective view of a multi-layer label assembly apparatus according to at least one embodiment of the present disclosure.

FIG. 17 shows a perspective view of label printer 500 with receptacle 502 affixed thereto, while label printer 500 continues in operation. As shown in FIG. 17, upper label 100" is dispensed by dispensing mechanism 501 of label printer 500 and alights on top of, and in registration with, lower label 100'. The labels 100, comprising upper label 100" on top of, and in registration with, lower label 100', extend over notched area 5023 of receptacle 502. As shown in FIG. 17, upper side 100A" of upper label 100" is exposed. Lower side 100B" of upper label 100", which bears adhesive on at least a portion thereof, is adhered to upper side 100A' of lower label 100' to a sufficient degree that the adhered-together labels 100 comprising upper label 100 in registration with lower label 100' can be handled as a unit, either mechanically (such as, for example, by a label applicator apparatus) or by hand. In at least one embodiment of the present disclosure, the adhered-together labels 100 may be removed from label receptacle 502 either mechanically (such as, for example, by a label applicator apparatus) or by hand, by grasping the portion of the adhered-together labels 100 in the region of the adhered-together labels 100 that extends over distal edge 5024 of receptacle 502.

After being presented with this disclosure, those skilled in the art will appreciate that a pair of labels 200 or a pair of labels 300 may be dispensed from label printer 500 in the same manner as described above with respect to the pair of labels 100.

After being presented with this disclosure, those skilled in the art will appreciate that removable region 222 of label 200 may be partially or fully removed from frame region 224 of label 200 in a similar manner as described above with respect to label 100. Notch 228 of label 200 facilitates access to line of weakness 210 of label 200, which may enhance the ease of removing removable region 222 from frame region 224 of label 200.

After being presented with this disclosure, those skilled in the art will appreciate that removable region 322 of label 300 may be partially or fully removed from frame region 324 of label 300 in a similar manner as described above with respect to label 100. The intersection of apex 328 with leading edge 302A, 302B of label 300 facilitates access to line of weakness 310 of label 300, which may enhance the ease of removing removable region 322 from frame region 324 of label 300.

While this disclosure has been described as having preferred designs, the apparatus and methods according to the present disclosure can be further modified within the scope and spirit of this disclosure. This application is therefore intended to cover any variations uses, or adaptations of the disclosure using its general principles. For example, any method disclosed herein and in the appended claims represent one possible sequence of performing the steps thereof. A practitioner may determine in a particular implementation that a plurality of steps of one or more of the disclosed methods may be combinable, or that a different sequence of steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains.

We claim:

1. A multi-layer label assembly apparatus comprising:

a label printing apparatus, said label printing apparatus comprising a printing mechanism, and a label dispensing mechanism; and a receptacle affixed to said label printing apparatus in a position adjacent said label dispensing mechanism, said receptacle constructed of a rigid material, said receptacle comprising a proximal edge adjacent to said label printing apparatus and a distal edge opposite said proximal edge, said receptacle further comprising at least one substantially horizontal surface suitable for receiving a label dispensed from said label dispensing mechanism, said label comprising an adhesive oriented toward said at least one substantially horizontal surface suitable, said at least one substantially horizontal surface located adjacent to and below said label dispensing mechanism, said at least one substantially horizontal surface being adhesive-resistant.

2. The multi-layer label assembly apparatus of claim 1, further comprising:

a first label on said substantially horizontal surface of said receptacle, wherein at least a portion of said first label overhangs said distal edge of said receptacle.

3. The multi-layer label assembly apparatus of claim 2, further comprising:

a second label layered over and aligned with said first label.

4. The multi-layer label assembly apparatus of claim 1, wherein said distal edge comprises a contour defining a notched area in said distal edge.

5. The multi-layer label assembly apparatus of claim 4, further comprising:

a first label on said substantially horizontal surface of said receptacle, wherein at least a portion of said first label overhangs said notched area.

6. The multi-layer label assembly apparatus of claim 5, further comprising:

a second label layered over and aligned with said first label.

7. The multi-layer label assembly apparatus of claim 1, further comprising:

a label presence sensor on said label printing apparatus; and a void in said receptacle, said void being in alignment with said label presence sensor.

8. The multi-layer label assembly apparatus of claim 7, further comprising:

a first label on said substantially horizontal surface of said receptacle, wherein at least a portion of said first label covers said void.

9. The multi-layer label assembly apparatus of claim 8, further comprising:

a second label layered over and aligned with said first label.

10. A multi-layer label assembly apparatus comprising:

a label printing apparatus, said label printing apparatus comprising a printing mechanism, and a label dispensing mechanism; and a receptacle positioned adjacent to said label dispensing mechanism but not affixed to said label printing apparatus, said receptacle constructed of a rigid material, said receptacle comprising a proximal edge adjacent to said label printing apparatus and a distal edge opposite said proximal edge, said receptacle further comprising at least one substantially horizontal surface suitable for receiving a label dispensed from said label dispensing mechanism, said label comprising an adhesive oriented toward said at least one substantially horizontal surface suitable, said at least one substantially horizontal surface located adjacent to and below said label dispensing mechanism, said at least one substantially horizontal surface being adhesive-resistant.

11. The multi-layer label assembly apparatus of claim 10, further comprising:

a first label on said substantially horizontal surface of said receptacle, wherein at least a portion of said first label overhangs said distal edge of said receptacle.

12. The multi-layer label assembly apparatus of claim 11, further comprising:

a second label layered over and aligned with said first label.

13. The multi-layer label assembly apparatus of claim 10, wherein said distal edge comprises a contour defining a notched area in said distal edge.

14. The multi-layer label assembly apparatus of claim 13, further comprising:

a first label on said substantially horizontal surface of said receptacle, wherein at least a portion of said first label overhangs said notched area.

15. The multi-layer label assembly apparatus of claim 14, further comprising:

a second label layered over and aligned with said first label.

16. The multi-layer label assembly apparatus of claim 10, wherein said receptacle comprises an upper surface and an opposing bottom surface, said multi-layer label assembly apparatus further comprising one or more legs connected to said bottom surface.

17. The multi-layer label assembly apparatus of claim 16, wherein at least one of said one or more legs is adjustable.

18. The multi-layer label assembly apparatus of claim 10, further comprising:

a label presence sensor on said label printing apparatus; and a void in said receptacle, said void being in alignment with said label presence sensor.

19. The multi-layer label assembly apparatus of claim 18, further comprising:

a first label on said substantially horizontal surface of said receptacle, wherein at least a portion of said first label covers said void.

20. The multi-layer label assembly apparatus of claim 19, further comprising:

a second label layered over and aligned with said first label.

* * * * *